(12) United States Patent
Molnar et al.

(10) Patent No.: US 6,547,883 B2
(45) Date of Patent: Apr. 15, 2003

(54) SPRAY COATING APPLICATOR APPARATUS AND METHOD

(75) Inventors: David L. Molnar, Newark, OH (US); Thomas O. Matteson, Pickerington, OH (US); Gary Gao, Newark, OH (US); Richard A. Green, Patasaka, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 56 days.

(21) Appl. No.: 09/773,359

(22) Filed: Jan. 31, 2001

(65) Prior Publication Data

US 2002/0100415 A1 Aug. 1, 2002

(51) Int. Cl.$^7$ .............................. B05C 3/12; B05C 5/00
(52) U.S. Cl. ...................... 118/325; 118/315; 118/326
(58) Field of Search ............................... 118/315, 325, 118/313, 314, 316, 326; 65/444, 447; 68/205 R

(56) References Cited

U.S. PATENT DOCUMENTS

| 2,022,750 A | 12/1935 | Toohey |
| 2,048,651 A | 7/1936 | Norton |
| 2,410,422 A | 11/1946 | Breene et al. |
| 2,450,916 A | 12/1948 | Coss et al. |
| 2,707,690 A | 5/1955 | Pearson |
| 2,707,847 A | 5/1955 | Anliker |
| 2,944,284 A | 7/1960 | Tillotson et al. |
| 3,032,813 A | 5/1962 | Stalego |
| 3,749,313 A | 7/1973 | Weitmann |
| 3,762,896 A | 10/1973 | Borst |
| 3,830,638 A | 8/1974 | Jumentier et al. |
| 4,141,709 A * | 2/1979 | Reese .............................. 65/2 |
| 4,338,361 A * | 7/1982 | Lin .............................. 118/326 |
| 4,512,281 A | 4/1985 | Yamanishi et al. |
| 4,517,916 A | 5/1985 | Barch et al. |
| 4,565,154 A * | 1/1986 | Mullins et al. ............. 118/410 |
| 4,899,688 A | 2/1990 | Heckrotte |
| 5,779,758 A | 7/1998 | Mann et al. |
| 5,795,391 A | 8/1998 | Niemann et al. |

FOREIGN PATENT DOCUMENTS

| DE | 2 102 786 | 8/1972 |
| EP | 0 022 333 | 1/1981 |
| EP | 0 796 662 A2 | 9/1997 |
| GB | 2 299 283 | 10/1996 |

* cited by examiner

Primary Examiner—Richard Crispino
Assistant Examiner—Yewebdar T. Tadesse
(74) Attorney, Agent, or Firm—Inger H. Eckert; Stephen W. Barns; Maria C. Gasaway

(57) ABSTRACT

An apparatus for applying a liquid composition to one or more fibers of a fan of fibers provides a housing defining an elongated passageway therethrough such that the fan of fibers travels along a path through the passageway. The apparatus further provides a plurality of centrifugal spray heads including at least a first centrifugal spray head mounted in the housing and supplied with the liquid composition under pressure for directing the liquid composition onto one or more fibers of the fan of fibers passing a first location of the path. The plurality of centrifugal spray heads further includes at least a second centrifugal spray head mounted in the housing and being supplied with the liquid composition under pressure to direct the liquid composition onto one or more fibers of the fan of fibers passing a second location of the path.

19 Claims, 18 Drawing Sheets

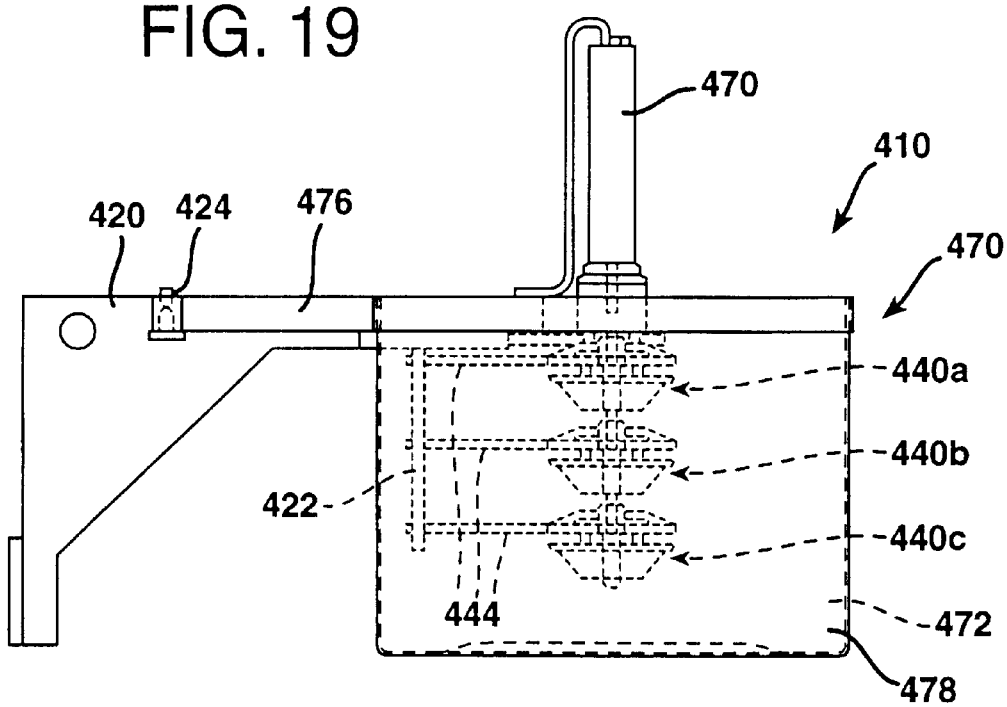
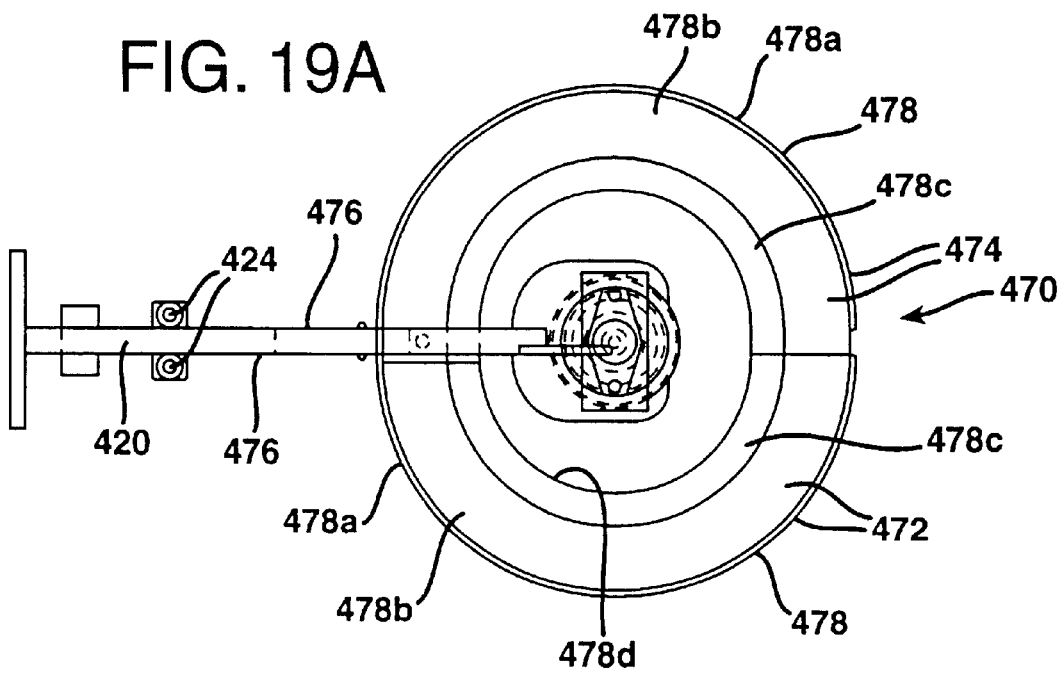

SPRAY COATING APPLICATOR APPARATUS AND METHOD

TECHNICAL FIELD AND INDUSTRIAL APPLICABILITY OF THE INVENTION

The present invention relates to systems for applying liquid compositions to the individual fibers of a fan of fibers. More particularly, the present invention relates to an apparatus for applying a liquid composition to the individual fibers of a fan of fibers, wherein the liquid composition is directed onto the fan of fibers such that a substantially uniform coating of the liquid composition is applied to each of the fibers.

BACKGROUND OF THE INVENTION

Fiberglass strands used, for example, in manufacturing fiberglass-reinforced products, typically are formed by gathering the individual fibers of a fan of glass fibers exiting a glass fiber-forming bushing and by combining the individual glass fibers into one or more strands. Typically, a sizing composition is applied, such as, by an applicator roll, to the individual fibers, wherein the sizing composition serves to reduce fiber stress caused by, for example, fiber-to-fiber friction associated with direct fiber-to-fiber contact. The applicator roll typically is cylindrical, is constructed from graphite and is driven to rotate at a modest rotational velocity, relative to the tangential linear velocity of the fibers as they pass over (and typically contact) the roll.

The sizing composition is applied to the roll, such as, for example, by submerging a portion of the roll into a shallow pool of sizing composition contained within a pan. The roll is then rotated such that the sizing composition is transferred to a position of the roll, whereat the fan of fibers momentarily contact, or "kiss", the roll and pick up a small quantity of the sizing composition. The amount of sizing applied to the fibers by the applicator roll is controlled, for example, by controlling the rotational velocity of the roll relative to the tangential linear velocity of the fibers as they kiss the roll. U.S. Pat. No. 4,517,916 to Barch, et al. is illustrative of prior art attempts to provide a cylindrical applicator roll for applying a chemical treatment to textile fibers.

However, an applicator roll typically does not substantially uniformly coat the fibers with the sizing composition. Moreover, direct fiber-to-roll contact oftentimes results in so-called "fiber walking" of the fibers over the surface of the roll, as well as increases shear and tensile stresses within the fibers. Of course, increasing the stresses within the fibers thereby increases the likelihood that the fibers may break while being gathering into a strand. More importantly, the imparted stresses may contribute to diminished performance in finished composite structures. Because conventional fiber gathering machines typically operate at high rates of speed, fiber breakage during gathering oftentimes results in significant periods of machine downtime and in the generation of excessive waste material. It is therefore desirable to provide an apparatus for applying a liquid composition to one or more fibers of a fan of fibers, wherein fiber stress is minimized.

One known method of applying a coating, for example, of fluent material, to a moving surface, such as, to a web of knitted or woven fabric, wherein it is not necessary to contact the web in order to apply the fluent material thereto, is taught by U.S. Pat. No. 5,795,391 to Niemann, et al., which provides a row of rotatable spray heads oriented transversely to a path of travel of the web. The rotatably spray heads are positioned within a shroud having an elongated opening, through which the spray heads direct a single plane-like stream of fluent material or course droplets onto the web as the web travels thereby. However, because coating efficiency typically decreases as the velocity at which the web travels past the elongated opening increases, a row of rotatable spray heads, such as is taught by Niemann '391, is not adapted to apply a coating, for example, of a sizing composition, to a fan of fibers, for example, of fiberglass fibers, which typically travels at a high rate of speed. It is therefore desirable to provide an apparatus for applying a liquid composition to one or more fibers of a fan of fibers traveling at a high rate of speed.

It is furthermore desirable to provide an apparatus for applying a liquid composition to one or more fibers of a fan of fibers traveling at a high rate of speed, wherein a substantially uniform coating of the liquid composition is applied to each of the fibers.

It is also desirable to provide an apparatus and method for applying a liquid composition to one or more fibers of a fan of fibers traveling at a high rate of speed, wherein a substantially uniform coating of the liquid composition is applied to the fibers, and wherein the apparatus does not contact the fibers directly.

SUMMARY OF THE INVENTION

The present invention is for an apparatus and method for applying a liquid composition to one or more fibers of a fan of fibers traveling at a high rate of speed. For example, the present invention provides an apparatus and method for applying a sizing composition to one or more fiberglass fibers being gathered into one or more fiberglass strands used, for example, as reinforcing fibers of a fiberglass-reinforced product.

According to a preferred embodiment of the present invention, an apparatus for applying a liquid composition to one or more fibers of a fan of fibers traveling at a high rate of speed includes a housing (also referred to herein as an "enclosure") defining an elongated passageway therethrough and a plurality of centrifugal spray heads mounted within the housing. Each of the plurality of spray heads receives liquid composition and directs atomized liquid composition into the passageway of the housing such that, as the fan of fibers travels along a path through the passageway, the fibers are coated substantially uniformly with droplets of the liquid composition.

Preferably, the plurality of spray heads include a first spray head positioned within the housing such that an atomized composition is directed therefrom towards a first location of the path, and a second spray head positioned within the housing such that an atomized liquid composition is directed therefrom towards a second location of the path. The first and second locations are spaced along the path such that atomized liquid composition is directed onto the fibers at at least two separate locations thereof, thereby increasing the overall coating efficiency of the apparatus.

In one implementation, the housing is of a substantially box-like construction surrounding the spray heads and includes an access panel removably affixed thereto for gaining access to the spray heads. A drive is mounted to the housing and is operatively connected to each of the spray heads, preferably in parallel, using timing belts or the like, to provide rotational movement of any rotational components of the spray heads. In another implementation, a shaft structure driven by an air motor or like device is provided for driving multiple spray heads in unison. The housing includes one mounting shelf for each of the spray heads. Each mounting shelf may include shields, baffles, deflectors, or the like, extending therefrom to control or direct either atomized liquid composition exiting the spray head mounted therein or air circulating within the housing. Each mounting shelf may be pivotably affixed to the housing such that the angle or orientation of the spray head mounted therein is adjustable, relative to the plane or path of travel of the fan of fibers moving through the passageway of the housing, thereby providing control of the angle at which the atomized liquid composition exiting the spray head impinges on the moving fan of fibers.

Assuming that the fan of fibers is substantially longer than it is wide, and assuming further that the fan of fibers travels along a path through the passageway, the first and second spray heads may be positioned either both facing one surface of the fan (i.e., both spray heads are on one side of the fan) or each facing an opposing surface of the fan (i.e., one spray head is on either side of the fan). Where the first and second spray heads are both positioned on the same side of the fan, a vacuum source may be connected to the housing on the other side of the fan, thereby drawing the atomized liquid composition through the fan of fibers and increasing the overall coating efficiency of the apparatus. Moreover, one or more air blast nozzles may be positioned near an outlet of the passageway to direct pressurized air thereacross, thereby reducing the amount of atomized liquid composition escaping from the housing through the outlet of the passageway.

A metering device, such as a conventional metering pump, is connected at a low pressure inlet thereof to a drain orifice in the housing and connected at a high pressure outlet thereof to a manifold supplying one or more of the spray heads with liquid composition, whereby runoff liquid composition not picked up by the fibers is re-circulated to the spray heads.

The present invention further provides a centrifugal spray head for use, preferably, with the apparatus and method according to the preferred embodiment hereof. The spray head constructed in accordance with one embodiment of the present invention includes a stator having a body defining an elongated throughbore and a substantially planar circumferential shear plate extending radially therefrom. A rotor shaft is positioned within the throughbore and includes an upper end projecting upwardly therefrom and a lower end projecting downwardly therefrom. A pulley is affixed to the upper end of the rotor shaft and is operatively connected to a drive, such as, for example, by a timing belt or the like, for rotating the rotor shaft within the throughbore. Alternatively, an air motor or like device, which may be coaxial with the rotor shaft, is coupled to the shaft to effect rotation thereof. A generally cup-shaped enclosure is affixed to the lower end of the rotor shaft and extends upwardly therefrom, terminating in a ring portion extending radially outwardly therefrom. The ring portion of the enclosure lies within a plane which is substantially parallel to, and spaced from, a plane in which the shear plate of the body lies. Rotation of the rotor shaft, then, rotates the enclosure, which rotates the ring portion thereof relative to the fixed shear plate of the body.

The rotor shaft includes an elongated passageway, which supplies liquid composition under pressure from an open upper end thereof to a liquid chamber formed between the body and the enclosure, through one or more orifices provided in the rotor shaft near the lower end thereof. Liquid composition, then, is supplied to the liquid chamber and expelled therefrom through a plurality of circumferential dispensing orifices. One or more upstanding dispensing ribs may project upwardly from an upper surface of the ring portion of the enclosure and ride against a lower surface of the shear plate. The dispensing ribs thereby define the radial orifices through which liquid sizing composition is expelled. The size, shape and layout of the orifices are provided to obtain a predetermined droplet size and density of the atomized liquid composition created thereby.

BRIEF DESCRIPTION OF THE DRAWINGS

A better understanding of the present invention will be had upon reference to the following description in conjunction with the accompanying drawings in which like reference numerals represent like parts, and wherein:

FIG. 19 is a side view of the apparatus illustrated in FIG. 18;

FIG. 19A is a top view of the apparatus illustrated in FIG. 18;

DETAILED DESCRIPTION AND PREFERRED EMBODIMENTS OF THE INVENTION

Figure 1:
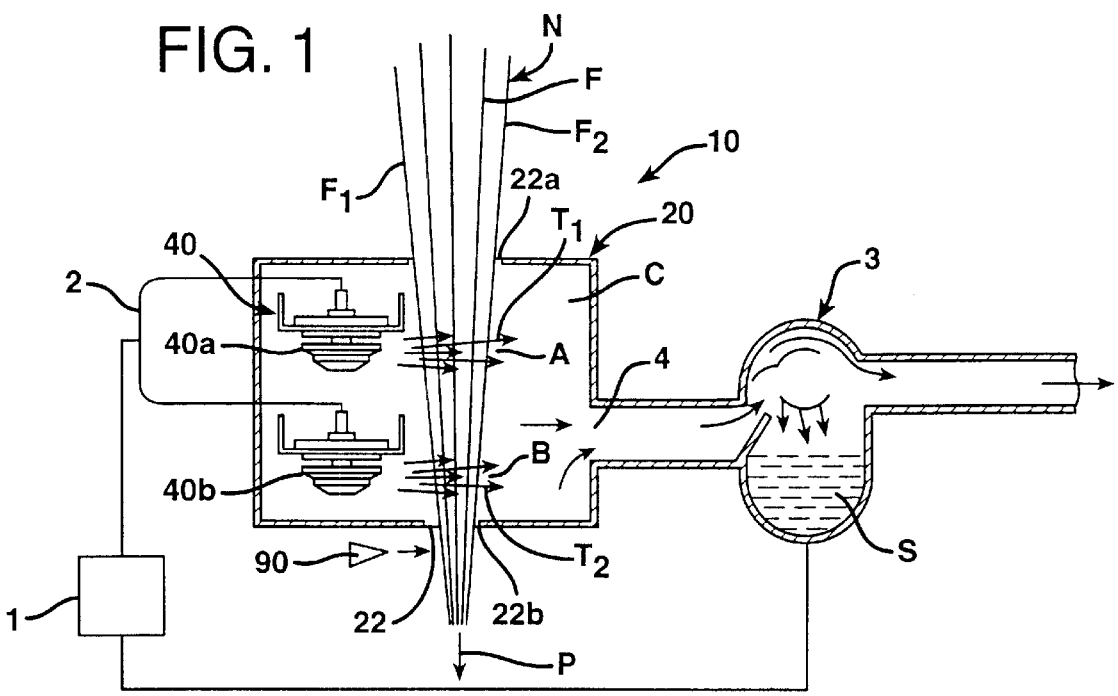
FIG. 1 is a diagrammatic side view of a system according to a preferred embodiment of the present invention.
Figure 2:
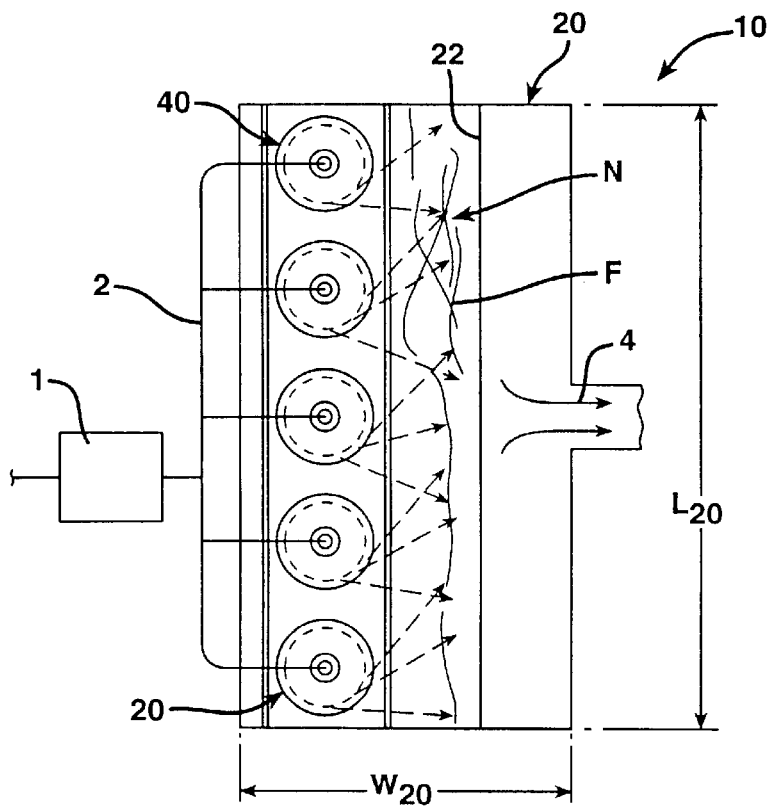
FIG. 2 is a diagrammatic top view of the system of FIG. 1.
Figure 3:
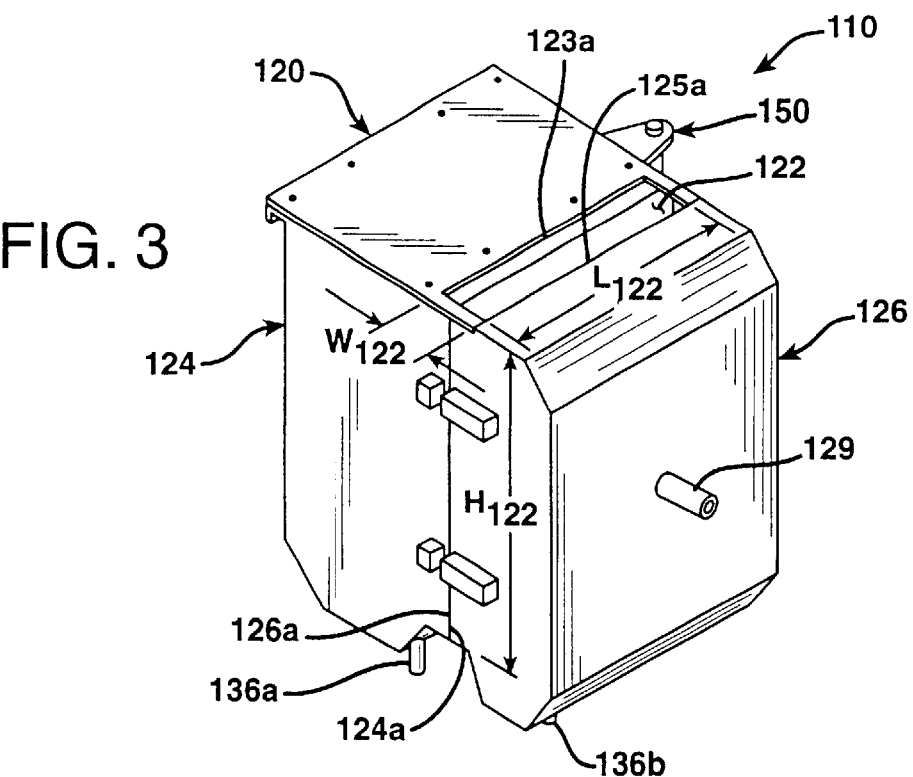
FIG. 3 is a perspective view of an apparatus for applying a liquid composition to the individual fibers of a fan of fibers according to a preferred embodiment of the present invention.
Figure 4:
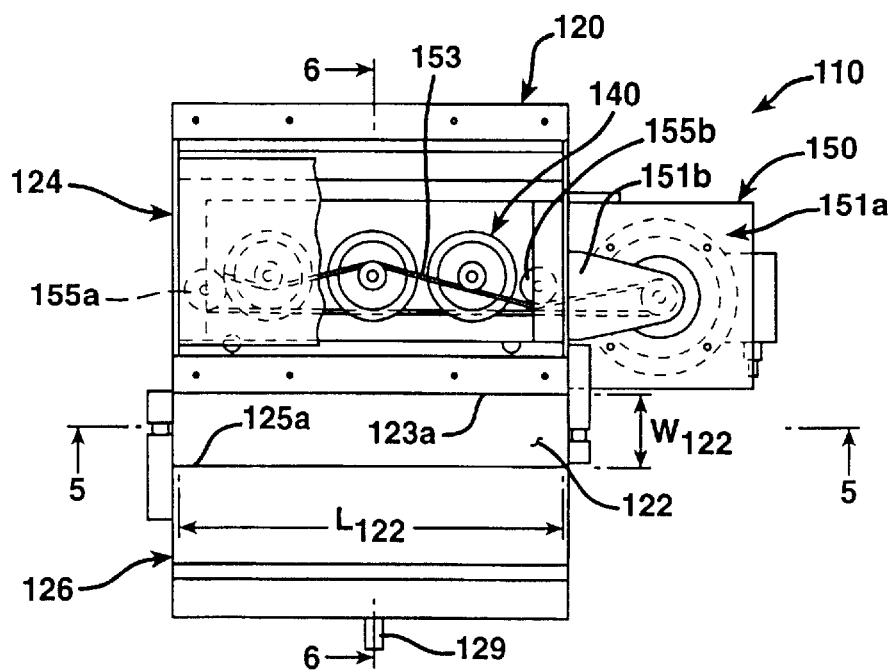
FIG. 4 is a top plan view of the apparatus of FIG. 3 with a portion of the housing removed.

With combined reference to FIGS. 1 and 2, a system for applying a liquid composition S to the individual fibers F of a fan N of fibers F according to an embodiment of the present invention is shown diagrammatically. As referred to herein, the system includes both an apparatus 10 and a method for applying the liquid composition S to the fibers F of the fan N of fibers F, and will be described herein with reference to applying an aqueous or non-aqueous sizing composition S to one or more fiberglass fibers F being gathered into one or more strands for use as reinforcing fibers in a fiberglass-reinforced product. However, it will readily be understood by those of ordinary skill in the art, upon reading the within disclosure, that the system described herein may be used to apply other coatings to other moving surfaces not described herein without departing from either the spirit or the scope of the present invention.

The apparatus 10 according to first, second and third embodiments includes a housing 20 (also referred to herein as an "enclosure") defining a passageway 22, through which the fan N of fibers F travels along a substantially linear path P from a wide upper end thereof near a glass fiber forming bushing (not shown) to a narrow lower end thereof near a radial gathering "shoe" (not shown). As is shown clearly in FIG. 2, the fan N includes both a length and a width, and as such, fibers F extend along path P and are positioned within the passageway 22 spaced from one another both in a direction along the length $L_{20}$ of the housing 20 and in a direction along the width $W_{20}$ of the housing 20. Typically, the fibers travel at a linear speed of from about 1500 feet/min. to about 3,500 feet/min.

The apparatus 10 further includes one or more applicators, preferably., one or more centrifugal spray heads 40, positioned within the housing 20 adjacent the passageway 22. Each of the spray heads 40 includes an inlet which is in fluid communication with a metering device, such as a conventional metering pump 1, through a supply manifold 2 connecting the pump 1 to each of the spray heads in a parallel pressure relationship. Metering pump 1, which is connected to a reservoir (not shown) of sizing composition S, supplies the sizing composition S under pressure to each of the spray heads 40, which, as described in greater detail hereinbelow, atomizes the sizing composition S and directs the atomized sizing composition S therefrom towards the fan N of fibers F traveling through the passageway 22 along the path P. The atomized sizing composition S is shown generally in the Figures with reference to streamlines T, $T_1$, $T_2$; however, it will be understood by those of ordinary skill in the art that an interior chamber C of the housing 20, which includes and surrounds the passageway 22 of the housing 20 will generally fill up with, and contain, air being partially saturated with atomized sizing composition S.

As shown particularly in FIG. 2, one or more spray heads 40 are positioned within the housing 20 in a side-by-side orientation spaced along substantially the length $L_{20}$ of the housing 20, thereby directing atomized sizing composition S along substantially the length of the fan N of fibers F. Moreover, as shown particularly in FIG. 1, first and second groups 40a, 40b of the spray heads 40 are positioned within the housing 20 in a vertically-aligned orientation spaced along a segment of the path P of the fan of fibers F within the passageway 22. The first group 40a of the spray heads 40 directs atomized sizing composition S along a first streamline $T_1$ towards the fan N at a first location A thereof along the path P, and the second group 40b of the spray heads 40 directs atomized sizing composition S along a second streamline $T_2$ towards the fan N at a second location B thereof along the path P. Each of the fibers F of the fan N, then, is exposed to multiple vapor streamlines $T_1$, $T_2$, each streamline $T_1$, $T_2$ directing atomized sizing composition S towards the fan N and causing tiny droplets of the atomized sizing composition S to be substantially uniformly deposited onto each of the fibers F of the fan N.

In the embodiment shown diagrammatically in FIGS. 1 and 2, all of the spray heads 40 face one surface $F_1$ of the fan N of fibers F, and as such, are all positioned on a first side of the fan N. A vacuum source, for example, an exhaust air diffuser 3, includes an inlet 4 connected to the housing 20 to create a negative pressure in the chamber C. The inlet 4 of the diffuser 3 faces an opposing surface $F_2$ of the fan N of fibers F, and as such, is positioned on a second side of the fan N, thereby creating a negative pressure gradient through the fan N of fibers F, directed from the first side of the fan N towards the second side of the fan N, and thereby drawing the atomized sizing composition S through the fan N of fibers F. Such negative pressure gradient increases the efficiency with which droplets of the atomized sizing composition S are deposited onto the fibers F of the fan N. The diffuser 3 is conventional in construction and is adapted to substantially separate the atomized sizing composition S droplets from the air, for example, due to the high pressure within the diffuser chamber. The sizing composition S which has been separated from the exhaust air by the diffuser collects within the diffuser chamber and may be re-circulated to the manifold 2, such as, by pump 1, to supply the spray heads 40. The exhaust air is expelled from the diffuser 3 into the surrounding ambient.

The fibers F of the fan N enter the passageway 22 though an inlet 22a thereof and leave the passageway 22 through an outlet 22b thereof. Accordingly, ambient air surrounding the exterior of the passageway inlet 22a is swept into the housing chamber C, through the inlet 22a of the passageway 22. Similarly, as the fibers F leave the passageway 22, though the outlet 22b thereof, air (having droplets of atomized sizing composition S partially saturated therein), is swept out of the housing chamber C. That is, the downward movement of the fan N of fibers B through the passageway 22 establishes a downwardly-directed current of vapor-saturate air out of the housing 20, through the outlet 22b of the passageway 22. To inhibit this, one or more air blast nozzles 90 are positioned external to the housing 20, near the passageway outlet 22b, to direct a stream of pressurized air across the outlet 22b, generally transverse to the path P along which the fan N of fibers F travel, thereby creating a region of high pressure outside of the housing 20, adjacent the passageway outlet 22b, and inhibiting the flow of air within the housing chamber C from being swept through the passageway outlet 22b due to the moving fibers F. The air streams being emitted from the air blast nozzles should be of a pressure which is sufficiently high to inhibit escape of the vapor-saturated air within the housing chamber C through the passageway outlet 22b, but should not be of a pressure which may cause damage to the fibers F. Air streams from air blast nozzles 90, then, cooperate with vacuum source 3 to contain the atomized sizing composition S substantially within the housing chamber C.

Figure 5:
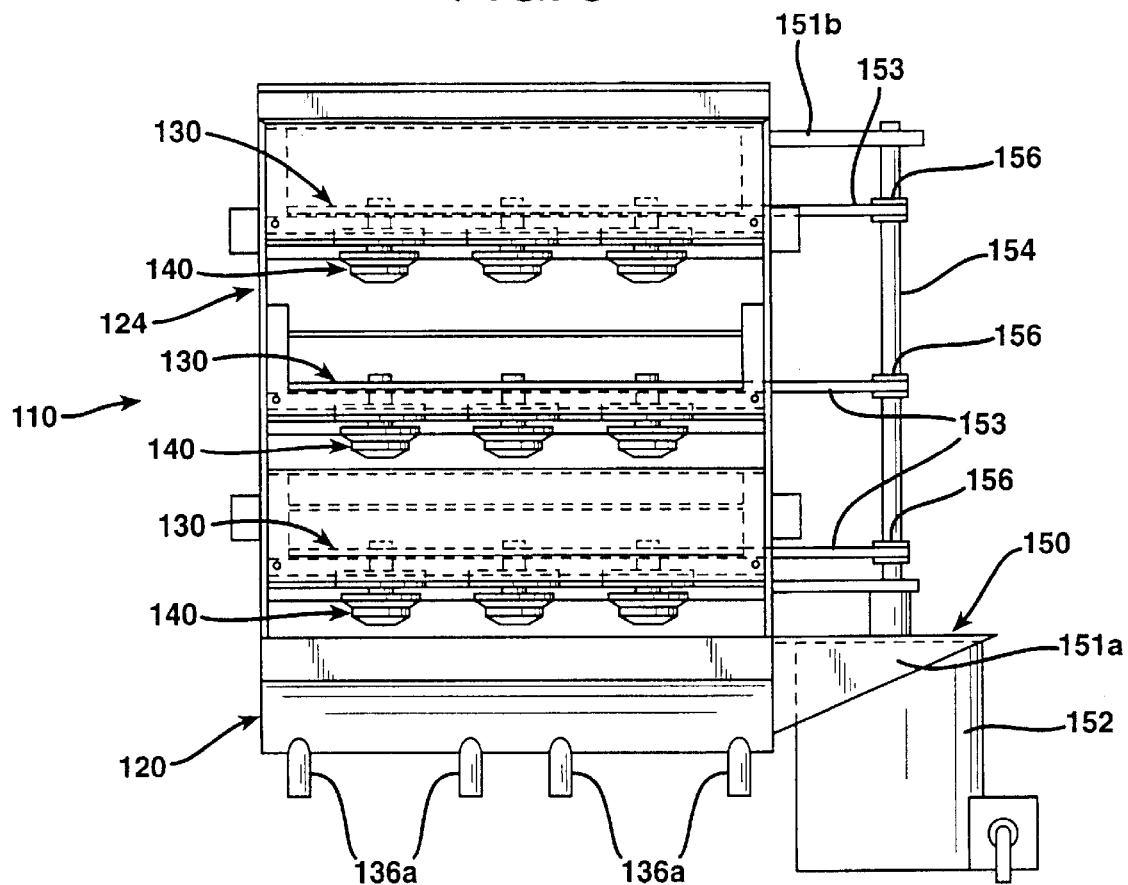
FIG. 5 is a front plane sectional view of the apparatus of FIG. 3, shown along section line 5—5 of FIG. 4.
Figure 6:
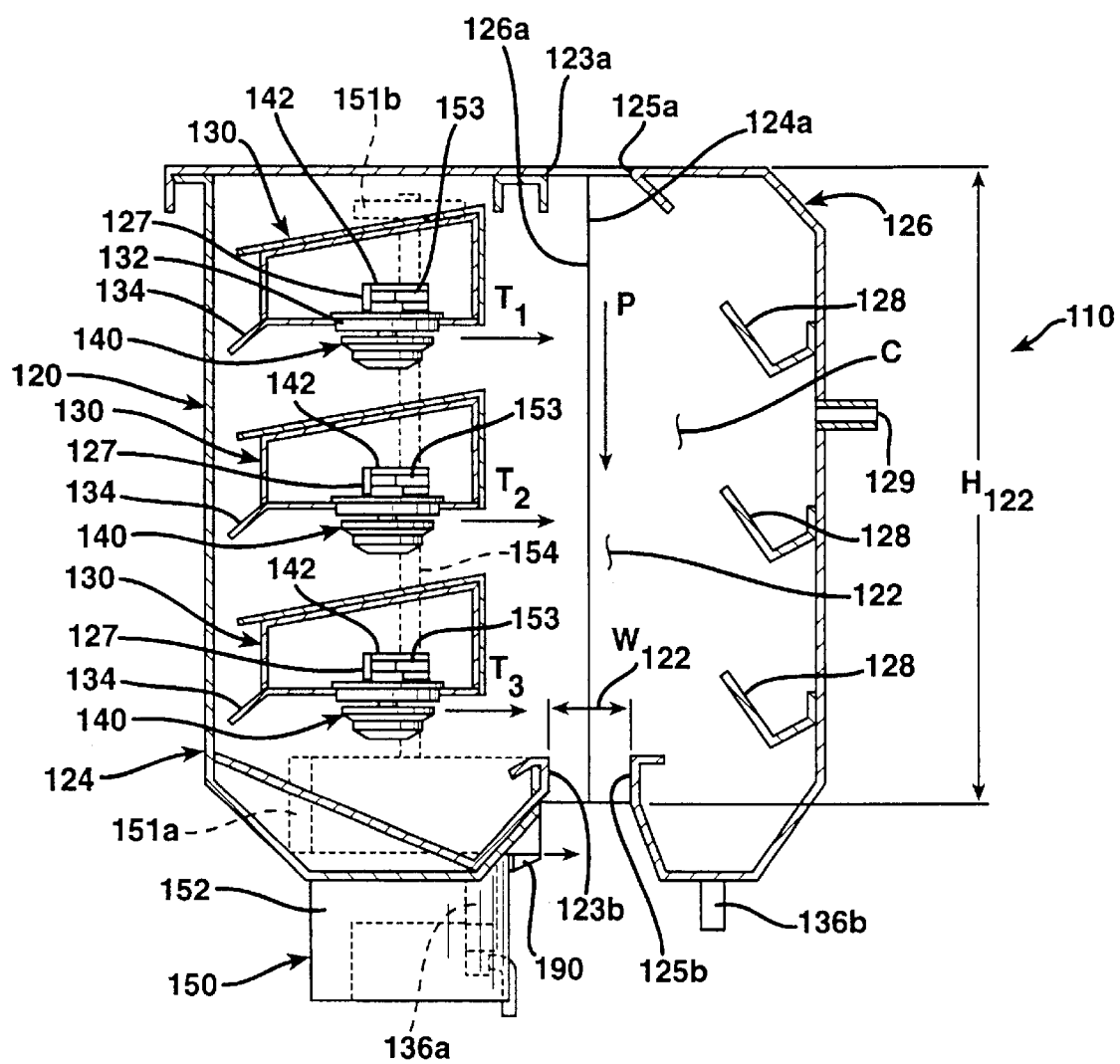
FIG. 6 is a side edge sectional view of the apparatus of FIG. 3, shown along section line 6—6 of FIG. 4.

With reference now to FIGS. 3–6, an apparatus 110 for applying a liquid sizing composition to a fan of one or more fiberglass fibers according to a first embodiment of the present invention (shown diagrammatically in FIGS. 1 and 2) includes a housing 120 defining an elongated passageway 122 and a plurality of centrifugal spray head applicators 140 positioned within the housing 120. The housing 120 is of a generally box-like construction and includes a shroud portion 124 surrounding the plurality of spray heads 140 and an access panel 126 removably affixed to the shroud portion 124 such that an open side 124a of the shroud portion 124 faces an open side 126a of the access panel 126 to define a housing chamber C enclosed by the shroud portion 124 and the access panel 126. The housing passageway 122 is defined by shroud cutouts 123a, 123b, each of which opposes a mating panel cutout 125a, 125b, respectively. The passageway includes a length $L_{122}$, a width $W_{122}$ and a height $H_{122}$ (FIG. 6). As is clearly shown in FIG. 6, the housing chamber C also includes, and generally surrounds, the housing passageway 122.

The access panel 126 is removably affixed to the shroud portion 124 by any conventional means, such as, for example, by one or more hold-down toggle clamps distributed by the DE-STA-CO company of Birmingham, Mich. The shroud portion 124 and the access panel 126 are each of a watertight, welded construction of a corrosive-resistant material, such as stainless steel.

The spray heads 140 are positioned within the shroud portion 124 of the housing 120 by one or more shelves 130 extending substantially along the length $L_{122}$ of the passageway 122, each of the one or more shelves 130 being vertically spaced from one another along the height $H_{122}$ of the passageway 122. Each shelf 130 includes one or more openings 132 spaced therealong, each opening being sized to receive therein, and to suspend therefrom, one spray head 140. The one or more shelves 130, and the plurality of spray heads 140 suspended therefrom, are positioned adjacent the passageway 122 such that liquid sizing composition supplied under pressure to the spray heads 140 is atomized thereby and directed towards the passageway 122 generally along stream lines $T_1$, $T_2$, $T_3$. Of course, chamber C will fill up with, and substantially contain air which has been partially saturated with tiny droplets of the atomized sizing composition. A fan of fibers, then, passing through the passageway 122, for example, from an inlet thereof defined by cutouts 123a, 125a to an outlet thereof defined by cutouts 123b, 125b, passes through a mist or fog of the atomized sizing composition, and the individual fibers of the fan of fibers is thereby coated uniformly with the droplets of the atomized sizing composition. Because the fan of fibers is effectively exposed to multiple streamlines $T_1$, $T_2$, $T_3$, as well as to the mist of the atomized sizing composition generally present within the chamber C, it is not necessary for only one of the streamlines $T_1$, $T_2$, $T_3$ to uniformly, and completely, coat each individual fiber of the fan of fibers. That is, portions of the individual fibers of the fan of fibers not coated with the sizing composition by streamline $T_1$, for example, will be coated with sizing composition by streamline $T_2$ or $T_3$. Spacing the spray heads 140 along the height $H_{122}$ of the passageway 122 (and thus, along the path P of travel of the fan of fibers through the passageway 122), effectively increases the so-called "dwell time" of the fibers in a sizing-rich environment, such as that provided by the atomized sizing composition within the chamber C, thereby permitting the fan of fibers to travel through the apparatus 110 at a high rate of speed. Moreover, increasing the "dwell-time" of the fibers in the sizing-rich environment of the chamber C permits use of misting-type spray heads 140 to provide a substantially uniform and continuous coating of sizing composition on each of the fibers of the fan of fibers.

With particular reference to FIG. 6, the vapor streamlines $T_1$, $T_2$, $T_3$ are each in a direction generally transverse to the direction of the path P along which the fibers of the fan of fibers travel through the passageway 122. Accordingly, one or more baffles 128 are affixed to the access panel 126, preferably such that one baffle 128 opposes each spray head 140, extending towards the spray heads 140 to control turbulent airflow within the chamber C. Moreover, each shelf 130 includes one or more deflectors 134, preferably one deflector 134 being positioned behind each spray head 140, projecting therefrom to also control turbulent airflow within the chamber C.

The deflectors 134 also direct the flow of atomized sizing composition being expelled from the spray heads 140 in a direction opposing streamlines $T_1$, $T_2$, $T_3$ towards a bottom of the housing 120. One or more drain orifices 136a, 136b are provided in the housing 120, for example, one or more drain orifices 136a provided beneath the shelves 130 and one or more drain orifices 136b provided beneath the baffles 128, each of which is connected in parallel to a low pressure inlet of a metering device, for example, the conventional metering pump 1 shown diagrammatically in FIGS. 1 and 2. Overflow and runoff liquid composition which does not coat the fibers of the fan of fibers, then, pools in the lower region of the housing 120 and is re-circulated to the spray heads 140 by the metering pump 1.

The access panel 126 includes a vacuum outlet fitting 129 connected to a vacuum source, such as the diffuser 3 shown diagrammatically in FIG. 1, for creating a negative pressure within the chamber C, and more particularly, for creating a negative pressure within a region of the chamber C enclosed by the access panel 126. The fitting 129 may be one of one or more such fittings spaced on the access panel 126, each such fitting being connected in parallel to the vacuum source 3. A negative pressure gradient is thereby created across the passageway 122 generally directed from a region of the chamber enclosed by the shroud 124 towards the region of the chamber C enclosed by the access panel 126.

With particular reference to FIG. 5, the plurality of spray heads 140 are driven in unison by a drive device 150, such as, for example, a conventional sealed 220 volt three-phase motor 152 connected in a conventional manner to an electrical power source (not shown). The motor 152 is preferably fixedly secured to the shroud portion 124 of the housing 120, for example, by a gusseted bracket 151a. A drive shaft 154 is coupled at a lower end thereof to an output shaft (not shown) of the motor 152 and is affixed at an upper end thereof to the shroud portion 124 of the housing 120, such as, for example, by a ball bearing (not shown) mounted within an upper bracket 151b.

One timing belt driving pulley 156 is provided for each shelf 130 and is fixedly secured to the drive shaft 154 adjacent its respective shelf 130. More particularly, the driving pulleys 156 are spaced along the drive shaft 154 such that each driving pulley 156 is aligned with a timing belt driven pulley 142 fixedly secured to a rotating portion of each spray head 140 spaced along one shelf 130. For example, in the most preferred embodiment hereof, three shelves 130 are provided within the housing 120 vertically spaced along the height $H_{122}$ of the passageway 122, each shelf having three spray heads 140 spaced therealong such that the driven pulleys 142 affixed to the spray heads 140 suspended from any one shelf 130 are aligned with one another. Accordingly, three driving pulleys 156 are provided along the drive shaft 154 such that one driving pulley 156 is aligned with each of the driven pulleys 142 of the spray heads 140 spaced along one of the three shelves 130.

A timing belt 153 connects each of the spray head driven pulleys 142 of one shelf 130 to one of the driving pulleys 156 affixed to the drive shaft 154 associated with the shelf 130. Because housing 120 forms a generally water-tight enclosure, an opening 127 is provided in the housing shroud 124 adjacent the shelf 130, through which the timing belt 153 connects the driving pulley 156 to the driven pulleys 142. A return pulley 155a (FIG. 4), as well as a tensioner pulley 155b (FIG. 4), may be provided and engage the timing belt 153 to control the tension therein. The timing belt 153 may engage the driven pulleys 142 of the spray heads 140 to cause rotation of their respective components either in the same direction, or in opposite directions. The timing belts 153 and pulleys 156, 142 may be replaced with other known power transmission equipment, such as, for example, chain-and-sprocket combinations, without departing from either the spirit or the scope of the present invention.

Although the preferred embodiment hereof has been described with reference to a single drive shaft 154 to which multiple timing belts 153 are engaged in a parallel arrangement, wherein each timing belt 153 drives in a series arrangement multiple spray heads 140 spaced along one of a plurality of shelves 130, the spray heads 140 spaced along any one of the plurality of shelves 130 may alternatively be driven by a timing belt 153 connected to an output shaft of one of a plurality of drive motors. That is, each timing belt 153 may alternatively be driven by a separate drive motor. Alternatively, each spray head 140 may be driven by a separate motor or drive device, in which case, timing belts 153 are not needed. Alternatively still, vertically-aligned spray heads 140 may be driven by a single motor, for example, by a drive shaft passing through each of the vertically-aligned spray heads 140. For example, it is contemplated that a single air motor, one of which is commercially available from Ingersoll-Rand Air Motors under the product designation "Series M002 Multi-Vane Air Motors," may be provided for each group of vertically aligned spray heads 140 and coupled to the spray heads through a single shaft structure, such as the one illustrated in FIG. 21, extending through the vertically aligned spray heads. In the embodiment illustrated in FIG. 5, three horizontally spaced air motors would be provided, each of which would be coupled to three vertically aligned spray heads.

With particular reference now to FIG. 6, one or more air blast nozzles 190, shown schematically both in FIG. 1 and in FIG. 6, are positioned adjacent the passageway outlet defined by cutouts 123b, 125b and are oriented to direct pressurized air across the passageway outlet, thereby creating a region of high pressure immediately downstream of path P through the passageway outlet. Chamber air trapped within a boundary layer surrounding each of the fibers of the fan of fibers traveling through the passageway 122 along the path P is inhibited from exiting the chamber C through the passageway outlet, but instead, remains within the chamber C.

Figure 7:
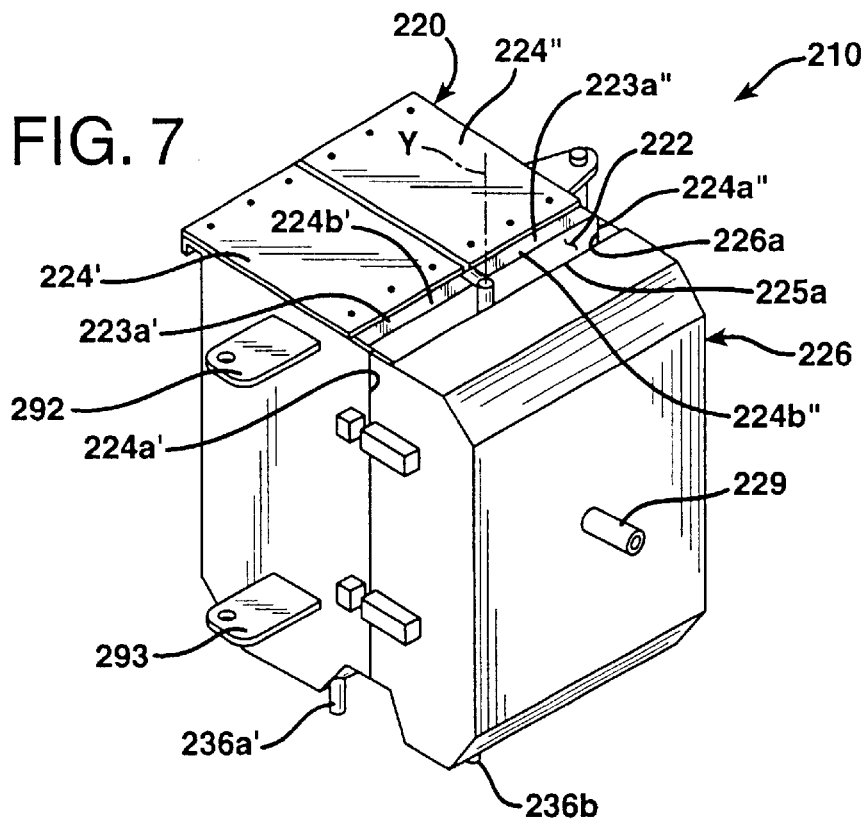
FIG. 7 is a perspective view of an apparatus for applying a liquid composition to the individual fibers of a fan of fibers according to an alternative embodiment of the present invention, wherein a housing of the apparatus is shown as two shroud portions positioned in a side-by-side arrangement.
Figure 8:
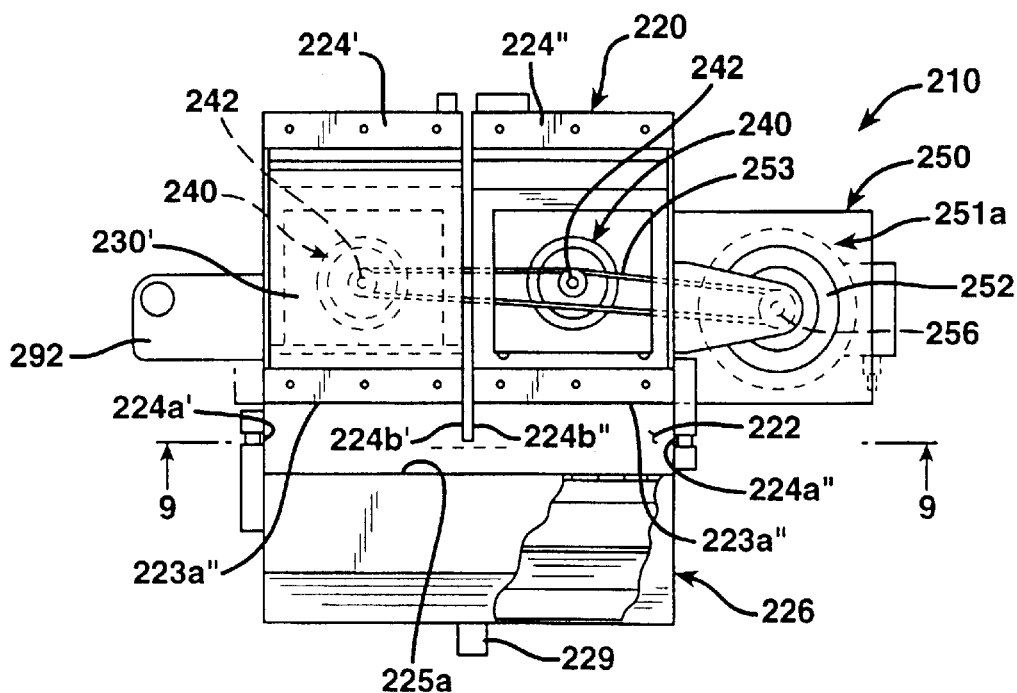
FIG. 8 is a top plan view of the apparatus of FIG. 7.
Figure 9:
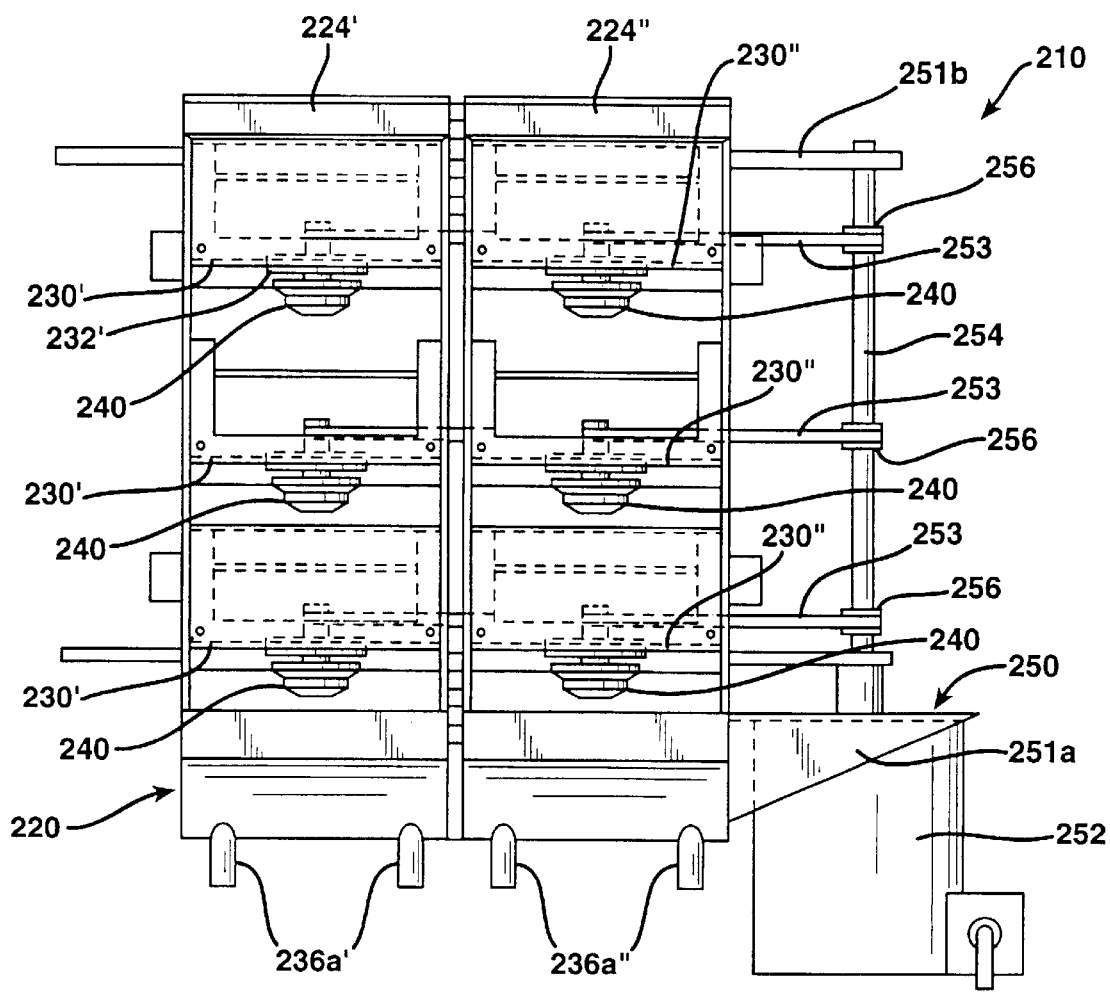
FIG. 9 is a front plane sectional view of the apparatus of FIG. 7, shown along section line 9—9 of FIG. 8.
Figure 10:
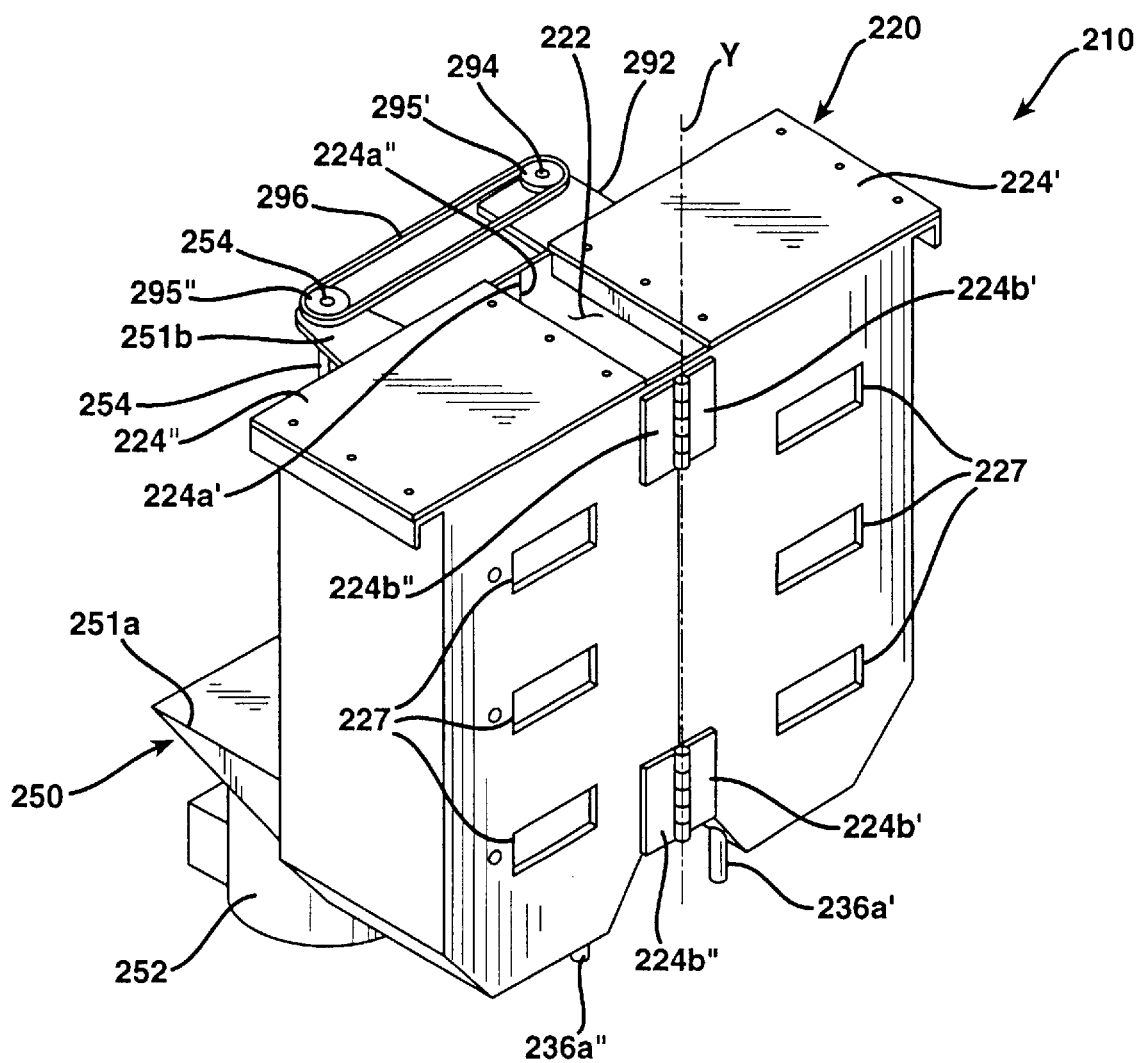
FIG. 10 is a perspective view of a third embodiment of the present invention.
Figure 11:
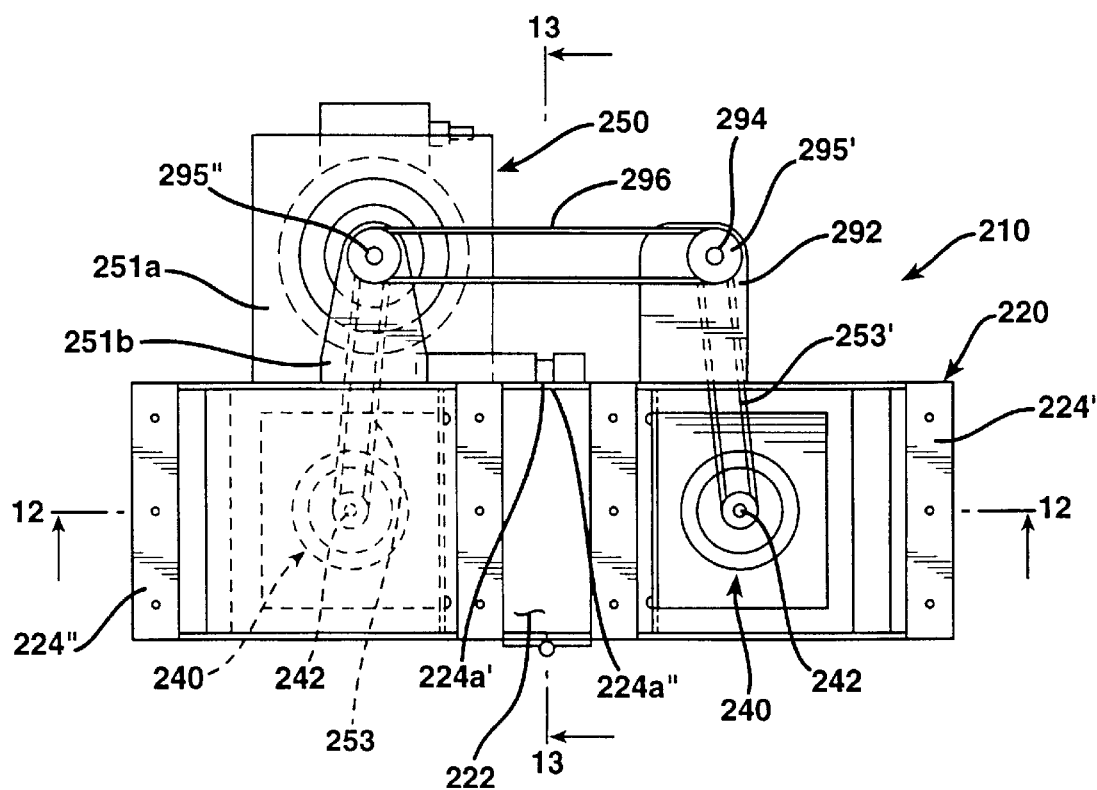
FIG. 11 is a top plan view of the apparatus of FIG. 10.
Figure 12:
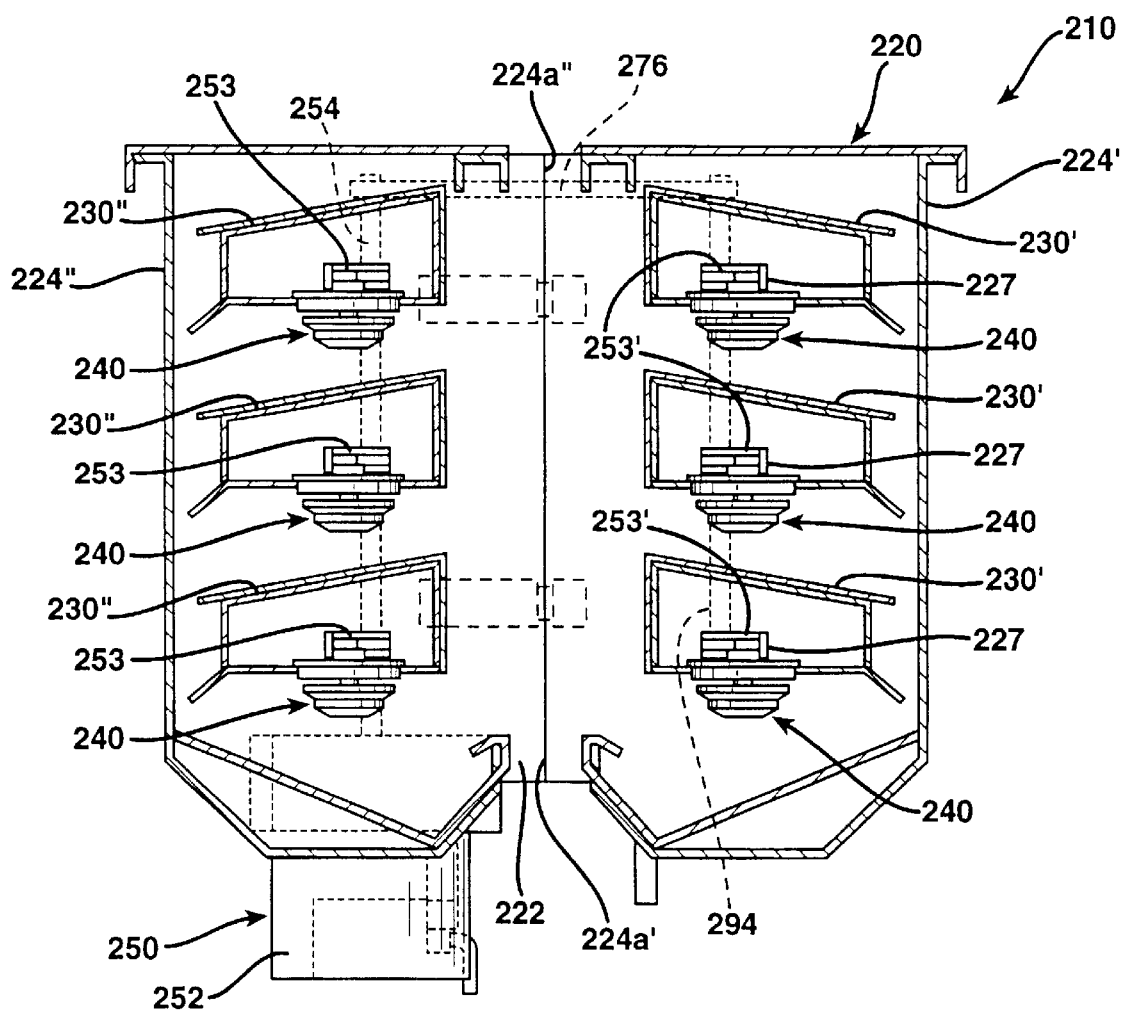
FIG. 12 is a side edge sectional view of the apparatus of FIG. 11, shown along section line 12—12 of FIG. 11.
Figure 13:
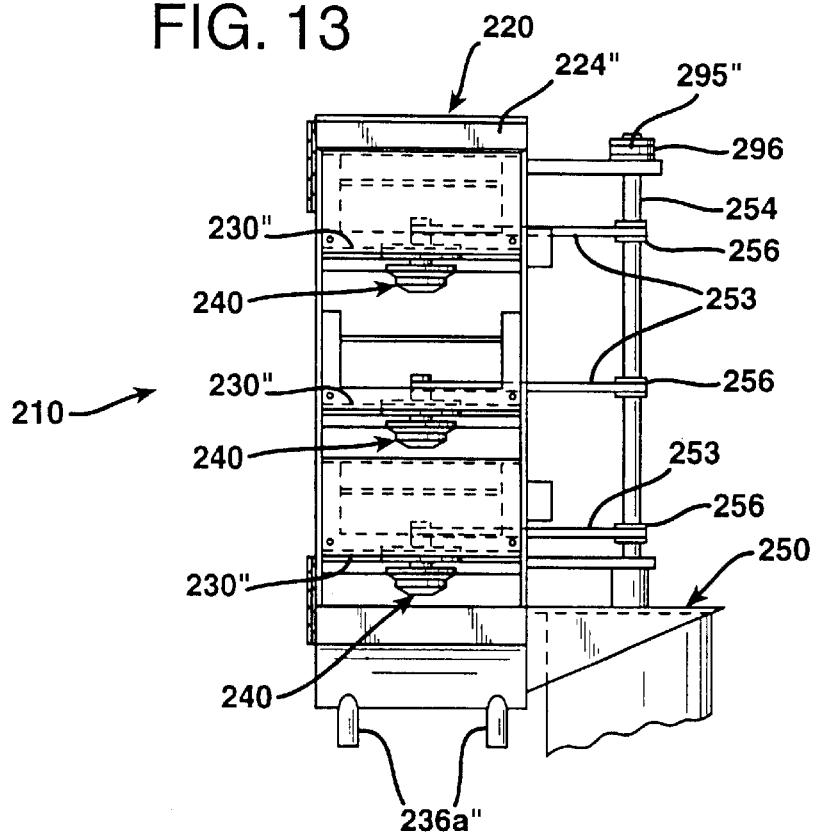
FIG. 13 is a side plane sectional view of the apparatus of FIG. 10, taken along section line 13—13 of FIG. 11.

With reference now to FIGS. 7–9, an apparatus 210 for applying a liquid sizing composition to a fan of one or more fiberglass fibers according to a second embodiment of the present invention shown diagrammatically in FIGS. 1 and 2 includes a housing 220 defining an elongated passageway 222 and a plurality of centrifugal spray heads 240 positioned within the housing 220. The apparatus 210 according to the present embodiment includes many components in common with the apparatus 110, and like reference characters are intended to represent like components. However, the housing 220 of the apparatus 210 according to the present embodiment includes a first shroud portion 224' and a second shroud portion 224" positioned next to the first shroud portion 224' in a side-by-side arrangement such that an open side 224a' of the first shroud portion 224' and an open side 224a" of the second shroud portion 224 face the same direction and are substantially coplanar.

First and second shroud portions 224', 224", respectively, are hingedly connected together to provide relative pivoting movement therebetween about a vertical axis Y extending generally along the passageway 222. A conventional piano hinge, or one or more conventional cylindrical hinges, may be used to hingedly connect an arm portion 224b' extending from the open side 224a' of the first shroud portion 224' to an arm portion 224b" extending from the open side 224a" of the second shroud portion 224". First and second shroud portions 224', 224", respectively, are preferably opposite in construction such that, when the shroud portions 224', 224" are positioned in the side-by-side arrangement shown in FIGS. 7–9, first shroud arm portion 224b' is adjacent to second shroud arm portion 224b".

An access panel 226 is positioned over the open sides 224a', 224a" of the first and second shroud portions 224', 224", respectively, and includes an open side 226a facing the open sides 224a', 224a" of the first and second shroud portions 224', 224", respectively, to define a housing chamber enclosed by the shroud portions 224', 224" and the access panel 226. The housing passageway 222 is defined by shroud upper cutouts 223a', 223a" which oppose a mating panel upper cutout 225a and shroud lower cutouts which oppose a mating panel lower cutout.

Each shroud portion 224', 224" includes one or more vertically-aligned spray heads 240, each spray head 240 being positioned within its respective shroud portion 224', 224" by a shelf 230', 230" which extends horizontally substantially across its respective shroud portion 224', 224". For example, referring to the first shroud portion 224' shown in FIG. 9, three shelves 230' are vertically spaced within the first shroud 224' and extend horizontally across the interior thereof. Each shelf 230' includes an opening 232' which is sized to receive therein, and to suspend therefrom, one spray head 240. Similarly, three shelves 230" are vertically spaced within the second shroud 224" and extend horizontally across the interior thereof Preferably, shelves 230', 230" are in side-by-side arrangement, as between first and second shroud portions 224', 224", and, in combination, can be viewed as pairs of vertically-aligned shelves 230', 230" positioning spray heads 240 in a vertically-spaced relation. The spray heads 240 are each connected in parallel to a source of pressurized liquid sizing material, such as by the pump 1 (FIG. 1) and manifold 2 (FIG. 1).

The access panel 226 includes a vacuum outlet fitting 229 connected to a vacuum source, such as the diffuser 3 shown diagrammatically in FIG. 1, for creating a negative pressure gradient across the passageway 222 for the purposes described hereinabove with respect to the preferred embodiment hereof. One or more drain orifices 236a' may be provided in the first shroud portion 224' vertically beneath the spray heads 240 therein and connected to the pump 1 (FIG. 1) to re-circulate overflow and runoff sizing composition. Similarly, one or more drain orifices 236a" may be provided in the second shroud portion 224" vertically beneath the spray heads 240 therein and one or more drain orifices 236b may be provided in the access panel 226.

Referring now to FIGS. 8 and 9, the spray heads 240 are driven in unison by a drive device 250, such as, for example, a conventional sealed 220 volt three-phase motor fixedly secured to the second shroud portion 224" of the housing 220 by a gusseted bracket 251a. A drive shaft 254 is coupled at a lower end thereof to an output shaft (not shown) of the motor 252 and is affixed at an upper end thereof to the second shroud portion 224" of the housing 220, such as, for example, by a ball bearing (not shown) mounted within an upper bracket 251b fixedly secured to the second shroud portion 224". A timing belt driving pulley 256 is provided for each pair of spray heads 240 and a timing belt driven pulley 242 is affixed to a rotating portion of each spray head 240, see FIG. 8. Slot-shaped openings (not shown) are provided in the first and second shroud portions 224', 224" and are located thereon to allow a timing belt 253 to connect in series each timing belt driving pulley 256 with the timing belt driven pulleys 242 of the pair of spray heads 240 associated with the driving pulley 256. The slot-shaped openings may be covered, for example, by a rubber curtain or flap, if it is not desirable for a timing belt 253 to pass therethrough so that atomized sizing composition does not escape from within the housing 220.

With reference to FIGS. 10–13, the apparatus 210 according to a third embodiment of the present embodiment is shown, wherein the access panel 226 has been removed, and wherein the first shroud portion 224' of the housing 220 has been pivoted about the hinge axis Y such that the open side 224a' of the first shroud portion 224' faces the open side 224a" of the second shroud portion 224", defining the passageway 222 therebetween. Upper and lower shaft brackets 292 (only upper bracket 292 is illustrated) are fixedly mounted to the first shroud portion 224' and are fitted with ball bearings (not shown) to rotatably mount a driven shaft 294 therebetween. A parallel driven pulley 295' is fixedly secured to an upper end of the driven shaft 294 and is horizontally-aligned with a parallel driving pulley 295" mounted to an upper end of the drive shaft 254 and is operatively connected to the parallel driving pulley 295" by a parallel timing belt 296. Driving pulleys (not shown) are affixed to the driven shaft 294 and are each operatively connected to one spray head 240 positioned within the first shroud portion 224' by a timing belt 253'.

Figure 14:
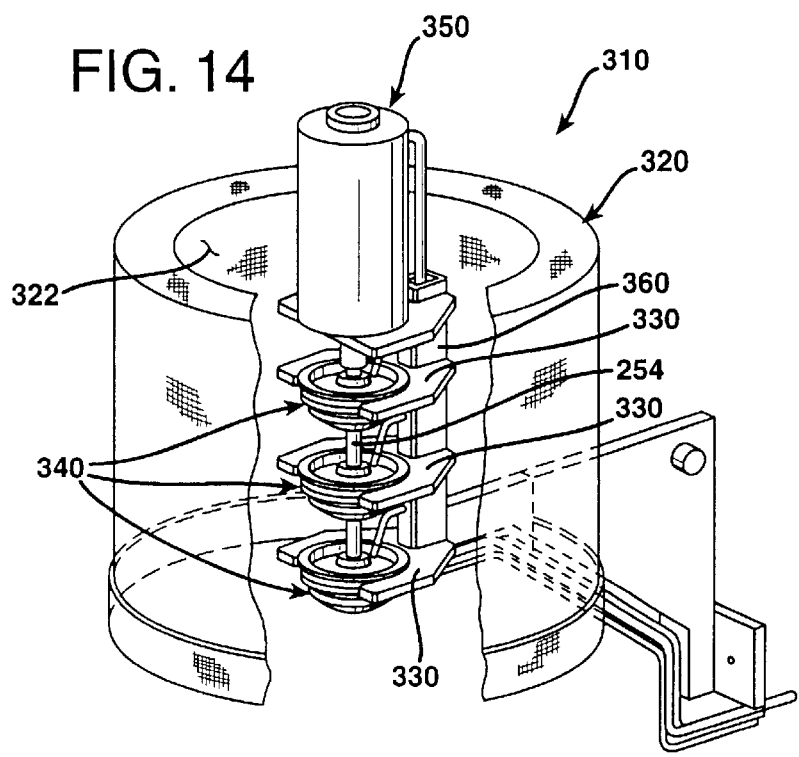
FIG. 14 is a partial sectional view of an apparatus for applying a liquid composition to the individual fibers of a fan of fibers according to a fourth embodiment of the present invention.

With reference to FIG. 14, an apparatus 310 for applying a liquid sizing composition to a fan of one or more fiberglass fibers according to a fourth embodiment of the present invention includes a housing 320 (also referred to herein as an "enclosure") defining an elongated passageway 322 and a plurality of vertically-aligned centrifugal spray head applicators 340 positioned within the housing 320. The apparatus 310 according to the present embodiment includes many components in common with the apparatus 110 illustrated in FIG. 3, and like reference numerals are intended to represent like components. However, the spray heads 340 according to the present embodiment are each mounted to an upright spine member 360, for example, by shelves 330, each of which positions one spray head 340 adjacent the passageway 322. A drive device 350, such as, for example, a conventional air motor, one of which is commercially available from Ingersoll-Rand Air Motors under the product designation "Series M002 Multi-Vane Air Motors," is fixedly mounted to the spine member 360 and includes an output shaft (not shown) which is coupled to a drive shaft 254 passing through each of the spray heads 340 to be fixedly secured to a rotating portion of each of the spray heads 340. It is also contemplated that a conventional electric motor may also be used in place of the air motor. A fan of fibers passing through the housing 320 of the apparatus 310 of the present embodiment may be substantially planar, such as the fan of fibers described hereinabove with reference to each of the embodiments heretofore discussed. Alternatively, because the spray heads 340 are supports by the spine member 360, the fan of fibers may be curved or have a semicircular shape, when viewed from above, thereby partially surrounding the spine member 360 and the spray heads 340 affixed thereto. Such an arrangement enhances the efficiency with which droplets of the atomized sizing composition are deposited onto the fibers of the fan.

Figure 15:
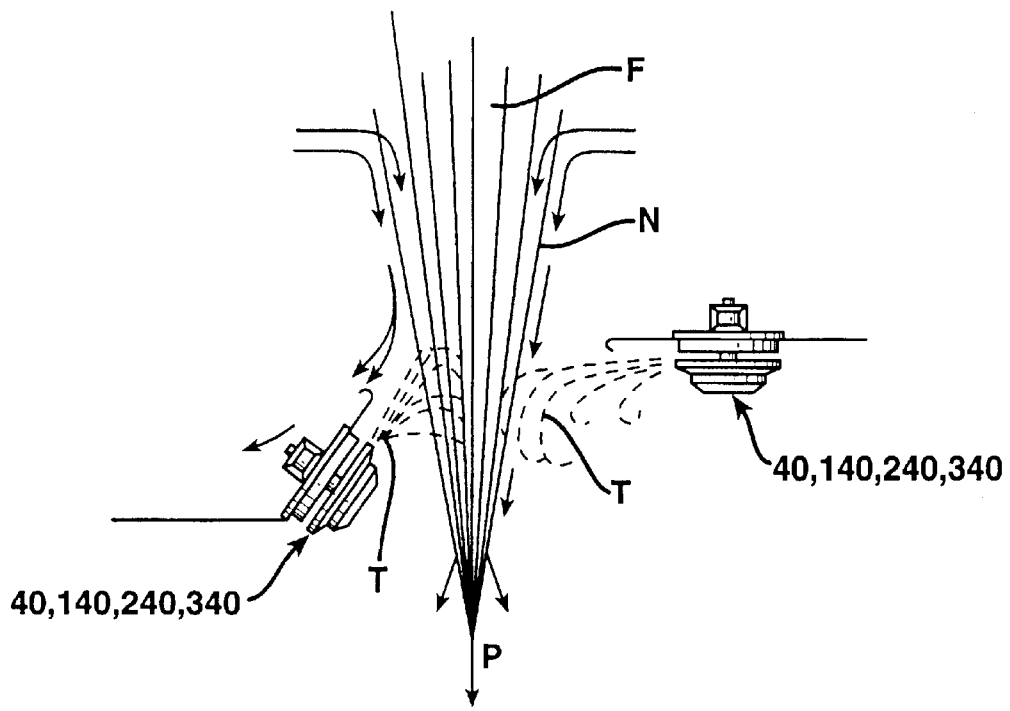
FIG. 15 is a diagrammatic view of one method of pivotably mounting a spray head of the apparatus of FIG. 3 to a housing of the apparatus of FIG. 3.

With reference to FIG. 15, fibers F of fan N, as they move through the housing substantially along the path P carry a boundary layer of air, generally resulting in a downward current of air through the housing. The spray heads 40, 140, 240, 340, 440 of any of the embodiments of the present invention, then, may be pivotably adjusted relative to a plane containing the path P along which the fan N of fibers F travels through the housing 20, 120, 220, 320 such that, as vapor streamlines T exit the spray head 40, 140, 240, 340, 440 tiny droplets of atomized sizing composition are substantially perpendicular to the fibers F of the fan N as the droplets approach, and impinge, the fibers F.

Figure 16:
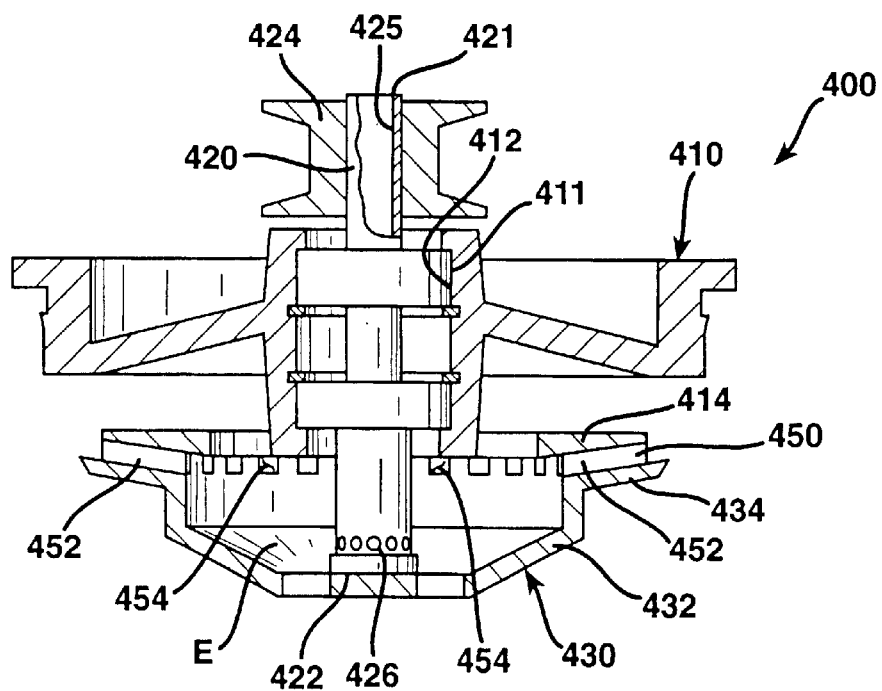
FIG. 16 is a diametrical sectional view of a spray head used in the apparatus of FIG. 3.

With reference to FIG. 16, a spray head 400 for use in any of the apparatuses 10, 110, 210, 310 of the present invention includes a stator 410 having a body 411 defining an elongated throughbore 412 therethrough and an annular shear plate 414 extending radially therefrom. A rotor shaft 420 is positioned within the throughbore 412 and includes an upper end 421 projecting upwardly therefrom and a lower end 422 projecting downwardly therefrom. A timing belt pulley 424 is fixedly secured to the rotor shaft 420 near the upper end 421 thereof and is operatively connected to a drive, for example, by a timing belt, for rotating the rotor shaft 420 within the throughbore 412. A generally cup-shaped enclosure 430 is fixedly secured to the rotor shaft 420 near the lower end 422 thereof and includes a conical portion 432 extending upwardly from the lower end 422 of the rotor shaft 420 towards the shear plate 414 of the stator 410. An annular ring portion 434 extends radially outwardly from an upper end of the conical section 432 of the enclosure 430 and rotates, along with the rotor shaft 420, in spaced relation to the shear plate 414.

The rotor shaft 420 is preferably hollow, thereby defining an elongated passageway 425 therethrough, which such passageway 425 is open at the upper end 421 of the rotor shaft 420. One or more radial orifices 426 are provided in the rotor shaft 420 near the lower end 422 thereof such that liquid sizing composition that is supplied under pressure to the passageway 425 of the rotor shaft 420 is pumped into a liquid chamber E formed between the enclosure 430 and the shear plate 414. As enclosure 430 rotates, then, liquid sizing composition in the enclosure is forced up an inside surface of the conical section 432 of the enclosure 430 and expelled from the spray head 400 through a plurality of circumferential dispensing orifices 454.

It is further contemplated that a separate tube (not shown) may extend through a bore in the stator 410 and be coupled to a supply manifold or directly to a metering pump so as to supply liquid sizing composition to the liquid chamber E. In this embodiment, sizing composition may not be supplied through the rotor shaft 420.

One or more upstanding dispensing ribs 452 may project upwardly from an upper surface of the ring portion 434 of the enclosure 430 and ride against a lower surface of the shear plate 414 as the enclosure 430 rotates relative to the stator 410. The dispensing ribs 452 thereby define the one or more radial orifices 454 through which liquid sizing composition is expelled. The size, shape and layout of the orifices 454 are provided to obtain a predetermined droplet size and density of the liquid composition vapor created thereby. It is contemplated that the size, shape, pattern and angle of the orifices 454 may be changed by removing the existing enclosure 430 and replacing it with a modified enclosure so as to vary the droplet size and/or density of the atomized liquid composition.

The stator 410, the rotor shaft 420 and/or the cup-shaped enclosure 430 may be formed from aluminum; stainless steel; nylon (66, etc.); polypropylene; Teflon®; a ceramic; or a fiber reinforced composite.

Figure 17:
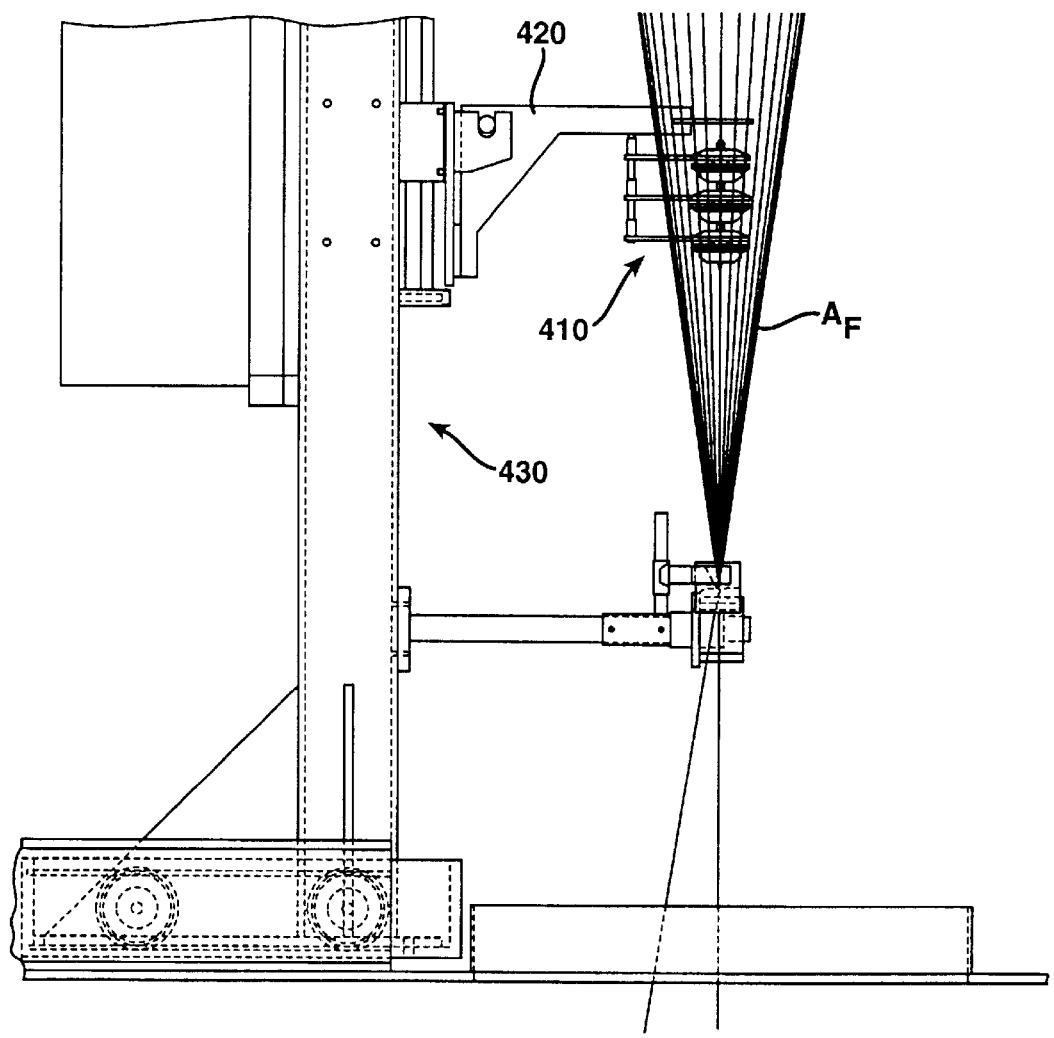
FIG. 17 is a side view of an apparatus mounted to a support structure for applying a liquid sizing composition to an annular fan of fibers according to a fifth embodiment of the present invention.
Figure 18:
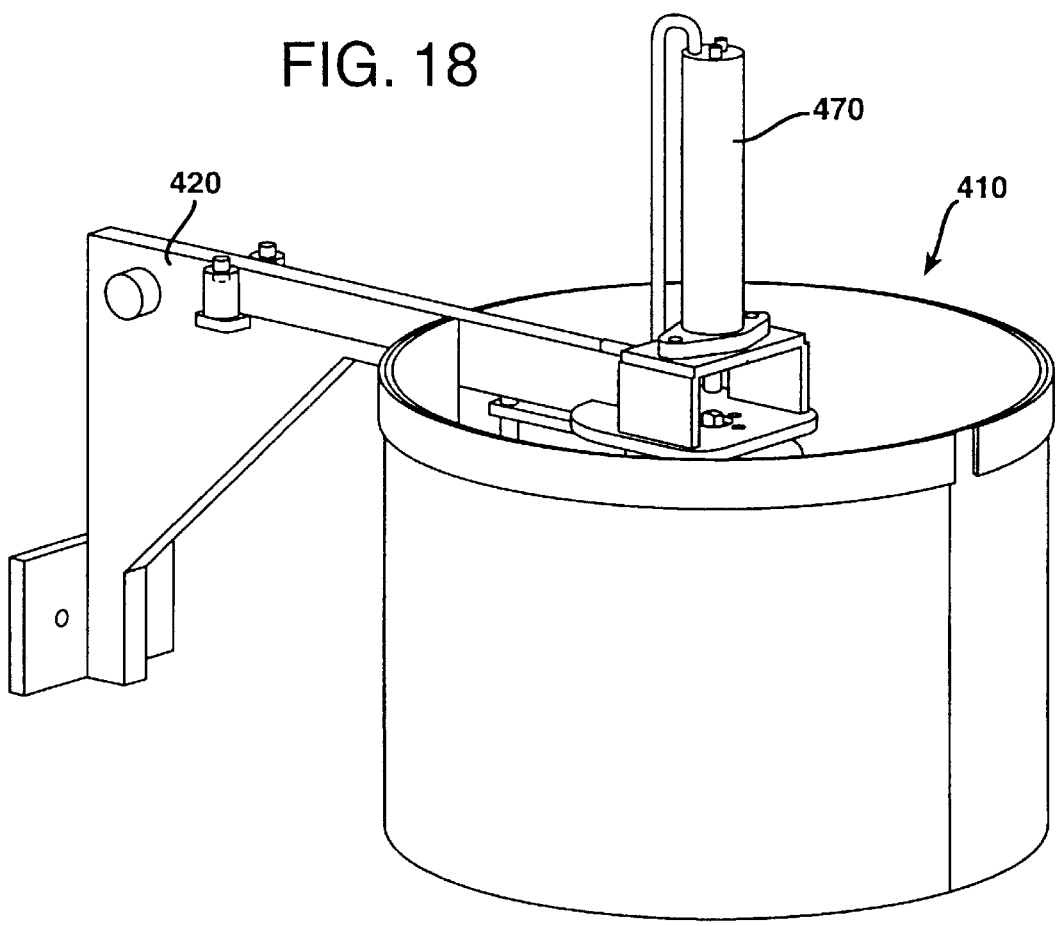
FIG. 18 is a perspective view of the fiber forming apparatus illustrated in FIG. 17 including a shroud.
Figure 20:
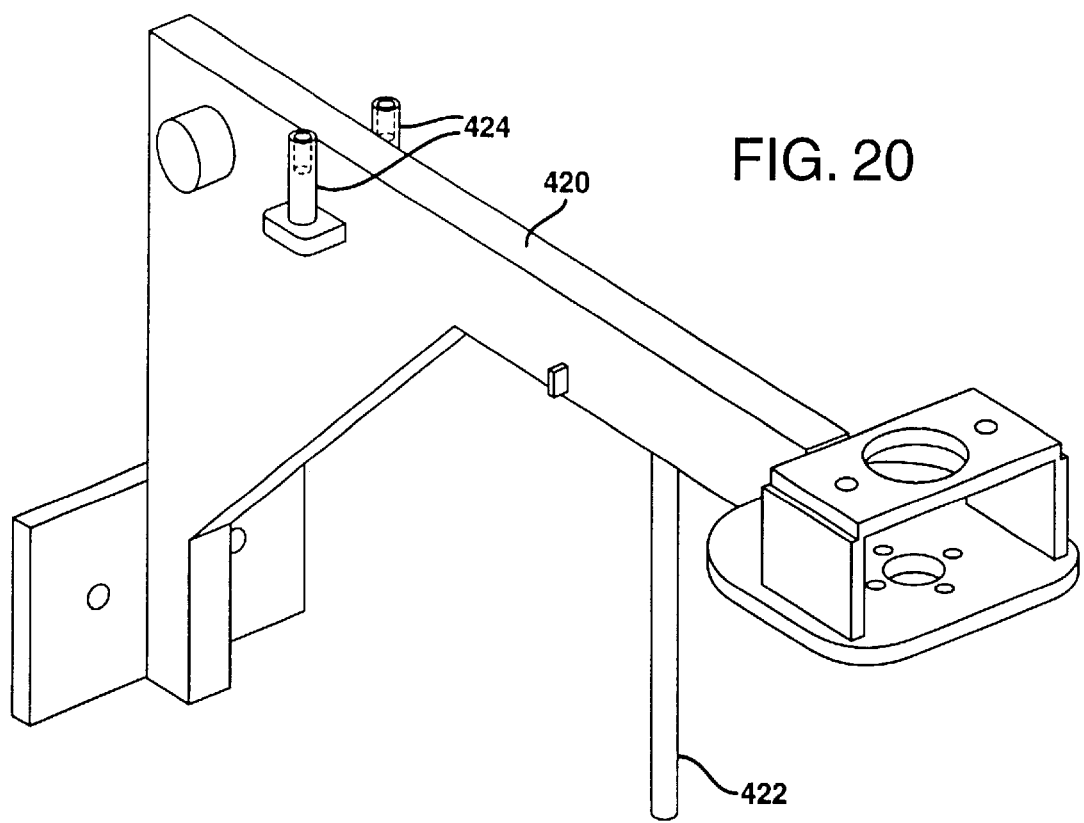
FIG. 20 is a perspective view of the support arm illustrated in FIG. 18.

An apparatus 410 for applying a liquid sizing composition to an annular or semi-annular fan AF of glass fibers drawn from a bushing (not shown) according to a fifth embodiment of the present invention is illustrated in FIGS. 17–19. The apparatus 410 comprises a main support arm 420, see also FIG. 20, which is supported by a holding structure 430. The support arm 420 supports first, second and third spray heads 440a–440c such that the spray heads 440a–440c are positioned within the fiber fan $A_F$ to apply sizing composition to the fibers from a position within the fiber fan $A_F$. This is advantageous because the sizing mist is carried with a boundary layer of air surrounding the fibers such that as the area occupied by the fibers is compressed, i.e., as the fan of fibers are drawn together, the sizing mist is forced into and through the fiber array by the evacuating air boundary layer. As illustrated in FIG. 17, the sized fibers are gathered into a strand via a gathering shoe made of a conventional material, e.g., micarta, ceramic, brass, etc. It is contemplated that the fiber fan may alternatively have a rectangular, triangular or other geometric shape or configuration.

Figure 21:
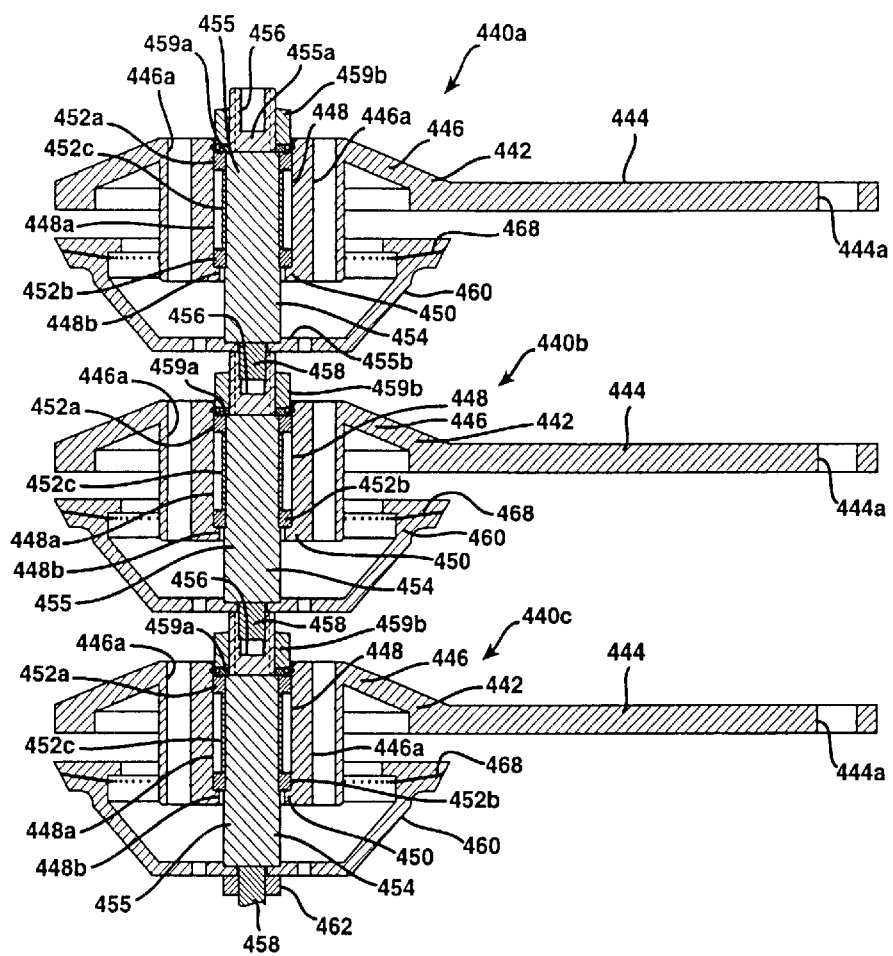
FIG. 21 is a view, partially in cross section, showing three spray heads of the apparatus of FIG. 18.
Figure 21A:
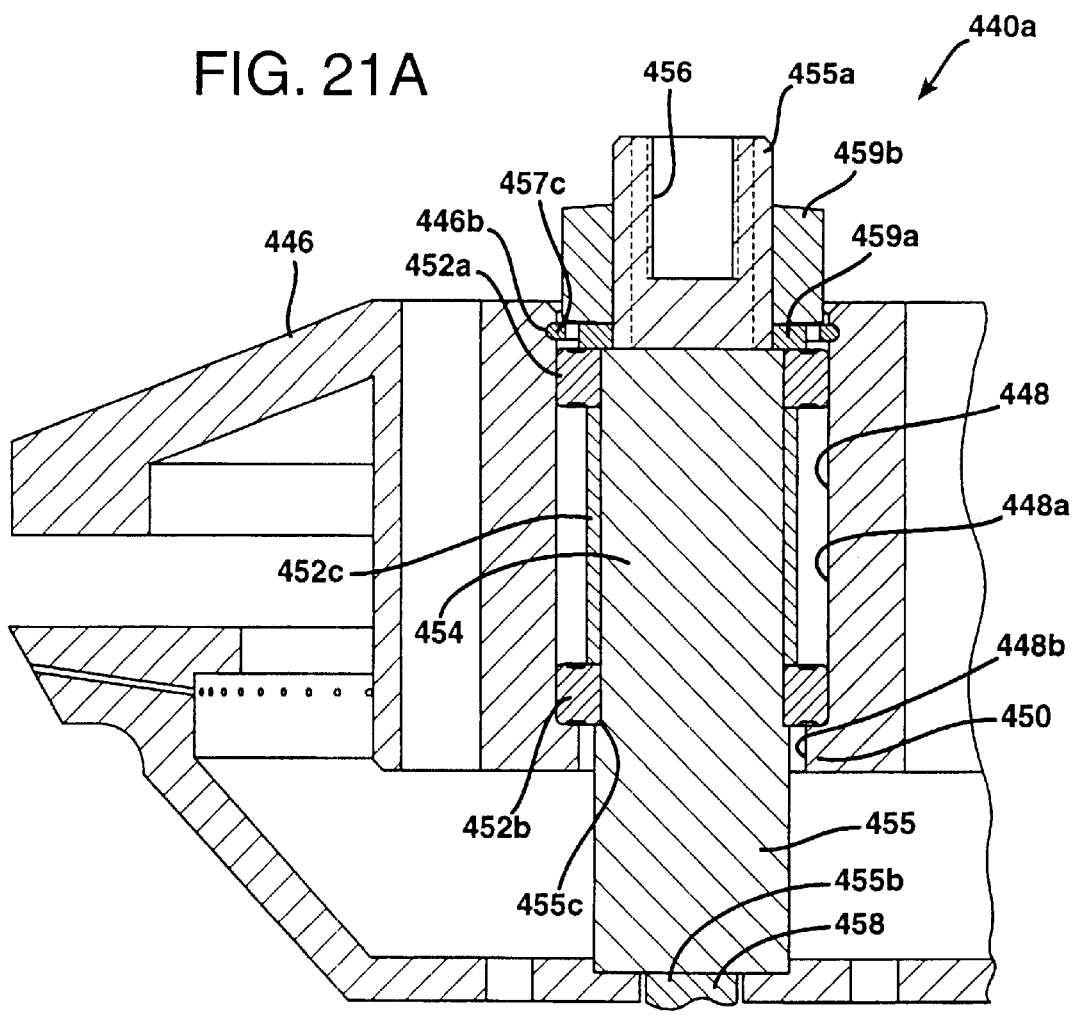
FIG. 21A is a view, in cross section, showing a portion of one of the spray heads illustrated in FIG. 21.

Referring now to FIGS. 21 and 21A, each spray head 440a–440c comprises a stator 442 having an extension arm 444 and an integral main body portion 446. The extension arm 444 is provided with a bore 444a for receiving a shaft 422 of the main support arm 420. The shaft 422 functions to prevent the stator 442 from rotating. The main body portion 446 is also provided with a bore 448, which extends completely through the main body portion 446. The bore 448 is formed having a first portion 448a of a first diameter and a second portion 448b of a second diameter, which is less than the first diameter such that a containment lip 450 is formed within the bore 448. First and second bearings 452a and 452b, which may comprise a conventional sealed-aircraft style bearing, are press-fitted into the bore 448. A spacer sleeve 452c separates the two bearings 452a and 452b and the bottom bearing 452b is press-fitted into the bore 448 until it contacts the containment lip 450, which acts as stop for the bearing 452b. A shaft 454 is press-fitted into the bearings 452a and 452b such that it is capable of rotating relative to the stator 442.

The shaft 454 includes a main body portion 455, a threaded bore 456 provided in a first end 455a of the main body portion 455, and a threaded extension 458 defined by a second end 455b of the main body portion 455. The shaft extension 458 of the first spray head 440a is threadedly received in the threaded bore 456 of the second spray head 440b, while the shaft extension 458 of the second spray head 440b is threadedly received in the threaded bore 456 of the third spray head 440c. Hence, rotation of the shaft 454 of the first spray head 440a effects rotation of the shafts 454 of the second and third spray heads 440b and 440c.

A washer 459a is fitted over the first end 455a of each shaft main body portion 455 and a nut 459b is threaded onto the first end 455a. A retainer ring 459c is snapped into an annular recess 446b formed in each stator main body portion 446, see FIG. 21A. A shoulder 455c is formed in the main body portion 455 of the shaft 454 and engages the inner race of the bearing 452b. As will be discussed below, the shaft 454 of the first spray head 440a is coupled to and supported by a drive device 470. The stator main body portion 446 of each spray head 440a–440c is maintained on its respective shaft 454 via the retainer ring 459c engaging the outer race of the bearing 452a, the inner race of the bearing 452a engaging the sleeve 452c, the sleeve 452c engaging the inner race of the bearing 452b and the inner race of the bearing 452b engaging the shoulder 455c.

Each spray head 440a–440c also comprises cup 460. The cup 460 of the first spray head 440a is interposed between and gripped by the shafts 454 of the first and second spray heads 440a and 440b. Similarly, the cup 460 of the second spray head 440b is interposed between and gripped by the shafts 454 of the second and third spray heads 440b and 440c. The cup 460 of the third spray head 440c is interposed between and gripped by the shaft of the third spray head 440c and a nut 462 coupled to the shaft extension 458 of the third spray head shaft 454. The cups 460 of each of the three spray heads 440a–440c rotate with the shafts 454.

A drive device 470, see FIGS. 18 and 19 (not shown in FIG. 17), such as, for example, a conventional air motor, one of which is commercially available from Ingersoll-Rand Air Motors under the product designation "Series M002 Multi-Vane Air Motors," is fixedly mounted to the main support arm 420 and includes an output shaft (not shown). The output shaft is coupled to the shaft 454 (via a standard shaft coupling device) of the first spray head 440a. Rotation of the output shaft of the drive device 470 effects rotation of the shafts 454 and cups 460 of the first, second and third spray heads 440a–400c. The cups 460 may rotate at a speed of from about 1500 RPM to about 6000 RPM.

Figure 22:
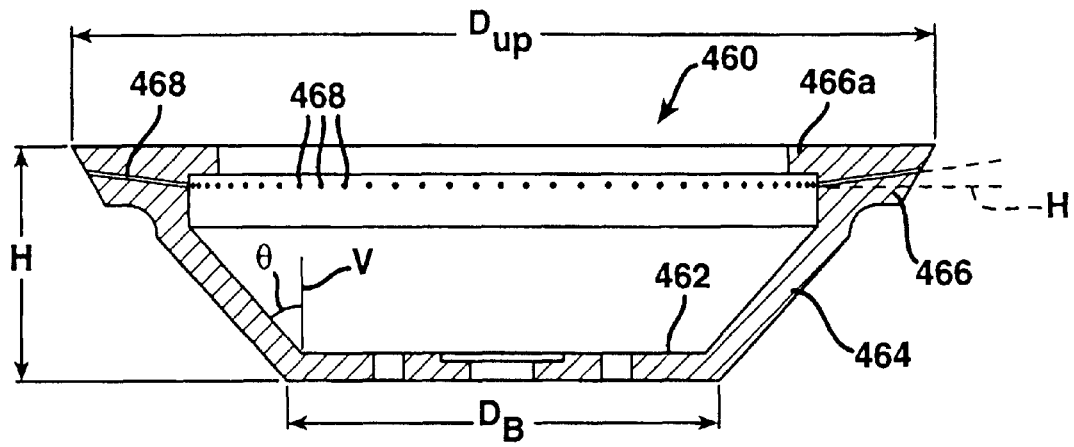
FIG. 22 is cross sectional view of a cup of one of the spray heads illustrated in FIG. 21.

Referring now to FIG. 22, each cup 460 comprises a base portion 462, a side portion 464, and an upper portion 466. The upper portion 466 has an extension 466a, which defines a lip for containing sizing composition received within the cup 460. The base portion 462 may have a diameter $D_B$ which is from about 1.85 inches to about 5 inches or more and preferably about 1.85 inches, while the upper portion 466 may have a diameter $D_{UP}$ which is about 3.76 inches. The height H of the cup 460 is about 1.0 inch. The side portion 464 of the cup 460 may extend at an angle 1 to vertical of between about 15 to about 85 degrees and preferably about 46 degrees. One or more rows (only a single row is illustrated in the FIG. 22 embodiment) of orifices 468 are drilled or otherwise formed in the upper portion 466 of the cup 460. Each orifice 468 may extend at an angle of from about 0 to about 45 degrees and preferably about 8 degrees to horizontal H. The orifices 468 may also be cylindrical in shape and have a diameter of from about 0.010 inch to about 0.040 inch and preferably about 0.019 inch. Further, the orifices 468 may be separated from one another by an angle of from about 5 degrees to about 15 degrees and preferably about 5 degrees. When the orifices 468 are separated from one another by 5 degrees, 72 orifices 468 are equally spaced about the outer periphery of the upper portion 466.

Figure 23:
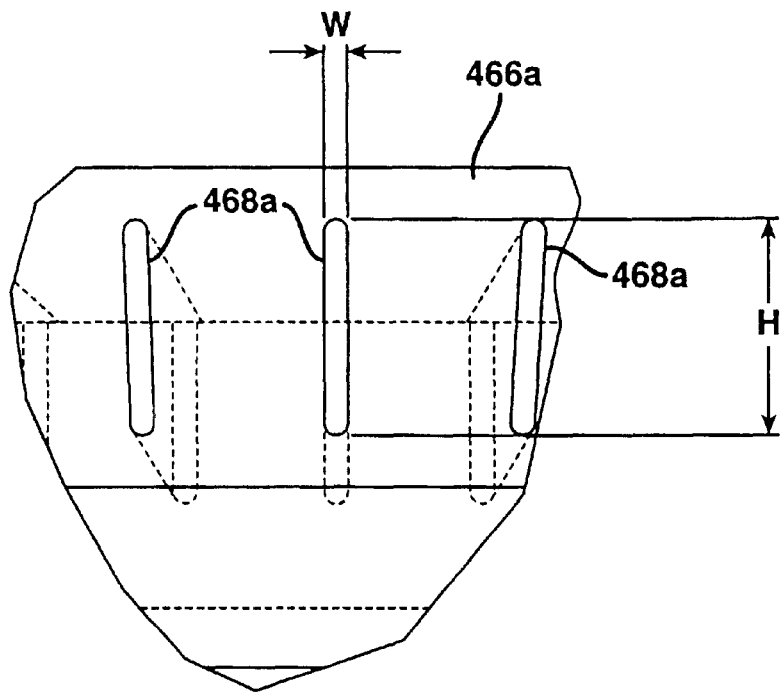
FIG. 23 illustrates a portion of a cup constructed in accordance with an alternative embodiment of the present invention.

Alternatively, the cup 460 may be formed with the orifices 468a having a slot-like shape, see FIG. 23. In this embodiment, the orifices 468a have a width W of about 0.010 inch to about 0.040 inch and preferably about 0.019 inch and a height H of about 0.171 inch. It is contemplated that 72 orifices 468a may be equally spaced about the outer periphery of the upper portion 466.

It is contemplated that the size, shape, pattern and angle of the orifices 468 or 468a may be changed by removing the existing cup 460 and replacing it with a modified cup so as to vary the droplet size and/or density of the atomized liquid composition.

The main body portion 446 further includes one or more passageways 446a through which sizing composition passes through the main body portion 446 and into the cup 460. The sizing composition may be supplied under pressure from a conventional metering pump (not shown) via a conventional manifold (not shown) and appropriate tubing (not shown). The liquid sizing composition may have a viscosity of from about 1 centipoise to about 500 or more centipoise. As the cups 460 of the spray heads 440a–440c rotate, liquid sizing composition is forced up an inside surface of each cup and expelled from the spray heads 440a–440c through the orifices 468 or 468a.

The stator 442, the shaft 454 and the cup 460 of the spray heads 440a–440c may be formed from any one of the materials set out above from which the spray head 400 is formed.

A shroud 470 (also referred to herein as an "enclosure") comprising first and second pivotable sections 472 and 474 is provided to capture sizing composition not received by the glass fibers, see FIGS. 18, 19, and 19A (not shown in FIG. 17). Each section 472 and 474 comprises an arm 476 fitted over a pin 424 on the main support arm 420 such that the sections 472 and 474 are pivotable relative to the arm 420. A substantially clear shield 478, formed from a conventional polymeric material, is coupled to each arm 476 and comprises a side portion 478a and a base portion 478b. The base portion 478b is provided with a weir 478c. When the two shields 478 are pivoted toward one another, as illustrated in FIGS. 19 and 19A, the weir 478c defines an annular opening 478d through which the fibers pass during a fiber-forming operation. Alternatively, the weir 478c could be replaced by a wall which extends vertically upward a short distance to define a dam to contain excess sizing composition. The base portion 478b of each shield 478 may include an opening (not shown) coupled to a tube through which the captured sizing composition drains from the shroud 470. In order to begin a fiber-forming operation, the two sections 472 and 474 are typically pivoted away from one another. Once the fiber-forming operation has been initiated, the sections are pivoted together.

With regard to the embodiments illustrated in FIGS. 1–13, it is contemplated that the electric motor, timing belts, driving pulleys, driven pulleys and drive shaft may be replaced by one or more air motors, each of which is positioned above one or more corresponding spray heads so as to be coaxial with the one or more spray heads.

Although the present invention has been described in terms of specific embodiments which are set forth in detail, it should be understood that this is by illustration only and that the present invention is not necessarily limited thereto, since alternative embodiments not described in detail herein will become apparent to those skilled in the art in view of the above description, the attached drawings and the appended claims. Accordingly, modifications are contemplated which can be made without departing from either the spirit or the scope of the present invention.

We claim:

1. An apparatus for applying a liquid composition to one or more fibers of a fan of fibers, comprising:

an enclosure defining an elongated passageway therethrough, said fan of fibers moving along a path through said passageway, wherein said passageway is connected to a vacuum source providing a negative pressure within a portion of said passageway surrounding said fan of fibers; and a plurality of centrifugal spray heads including at least a first centrifugal spray head located in said enclosure and supplied with said liquid composition under pressure for directing said liquid composition onto one or more fibers of said fan of fibers passing a first location of said path;

said plurality of centrifugal spray heads further including at least a second centrifugal spray head located in said enclosure and being supplied with said liquid composition under pressure to direct said liquid composition onto one or more fibers of said fan of fibers passing a second location of said path.

2. The apparatus of claim 1, wherein said fan of fibers passes between said first centrifugal spray head and said second centrifugal spray head.

3. The apparatus of claim 1, said plurality of centrifugal spray heads further including at least a third centrifugal spray head located in said enclosure adjacent said first centrifugal spray head, said third centrifugal spray head being spaced from said first centrifugal spray head in a direction transverse to an in-line direction of said path, said third centrifugal spray head being supplied with said liquid composition under pressure to direct said liquid composition onto one or more fibers of said fan of fibers passing said first location of said path.

4. The apparatus of claim 3, wherein said fan of fibers passes between said first centrifugal spray head and said third centrifugal spray head.

5. The apparatus of claim 1, further comprising:

at least one air blast nozzle positioned near an outlet of said passageway for directing a stream of pressurized air across said outlet of said passageway.

6. The apparatus of claim 1, further comprising:

a metering device having an inlet end in fluid communication with a drain orifice in said enclosure and an outlet end in fluid communication with a manifold connected to said first and second centrifugal spray heads, said metering device delivering excess liquid composition from said enclosure to each of said first and second centrifugal spray heads.

7. The apparatus of claim 1, wherein said first centrifugal spray head is mounted such that liquid composition being sprayed therefrom is moving in a direction substantially perpendicular to said path of said fan of fibers when said liquid composition impinges said one or more fibers of said fan of fibers.

8. The apparatus of claim 1, wherein said first location is spaced from said second location by a predetermined distance along said path.

9. The apparatus of claim 1, wherein said first centrifugal spray head and said second centrifugal spray head are each operatively connected to a drive device.

10. The apparatus of claim 9, wherein said drive device comprises an air motor.

11. The apparatus of claim 1, wherein said fan of fibers surrounds a portion of each of said first and second centrifugal spray heads.

12. The apparatus of claim 1, wherein said enclosure comprises:
- a first shroud portion surrounding said first centrifugal spray head and having an open side thereof; and,
- a second shroud portion surrounding said second centrifugal spray head and having an open side thereof, wherein said first shroud portion is removably connected to said second shroud portion.

13. The apparatus of claim 12, wherein said open side of said first shroud portion opposes said open side of said second shroud portion and is spaced therefrom to define said passageway therebetween.

14. The apparatus of claim 12, wherein said open side of said first shroud portion is in side-by-side alignment with said open side of said second shroud portion, and wherein said enclosure further includes an access panel positioned over said open sides of said first and second shroud portions, said access panel being removably connected to said first and second shroud portions, said access panel having an open side opposing said open sides of said first and second shroud portions and being spaced therefrom to define said passageway therebetween.

15. The apparatus of claim 1, wherein said enclosure comprises:
- a shroud portion surrounding said first and second centrifugal spray heads and having an open side thereof; and,
- an access panel removably connected to said shroud portion and having an open side thereof opposing said open side of said shroud portion, said open side of said access panel being spaced from said open side of said shroud portion to define said passageway therebetween.

16. An apparatus for applying a liquid sizing composition U one or more fibers of a fan of fibers from a position within said fan of fibers, comprising:
- a support structure extending into said fan of fibers, wherein a plurality of spray heads are coupled to said support structure, each of which comprises:
- a stator having a bore;
- a bearing provided in said bore;
- a shaft extending through said bearing for rotation relative to said stator and
- a cup coupled to said shaft for rotation with said shaft wherein the shaft of a first spray head is coupled to a drive device and a shaft of a second spray head is coupled to the shaft of the first spray head so as to rotate with the shaft of the first spray head; and
- wherein said spray heads are supplied with said liquid composition for directing said liquid composition onto one or more fibers of said fan of fibers from within said fan of fibers.

17. The apparatus of claim 16, wherein said spray head comprises:
- a stator having a bore;
- a bearing provided in said bore;
- a shaft extending through said bearing for rotation relative to said stator and being coupled to a drive device; and
- a cup coupled to said shaft for rotation with said shaft.

18. The apparatus of claim 17, wherein said drive device comprises an air motor.

19. The apparatus of claim 16, wherein said chive device comprises an air motor.

* * * * *

UNITED STATES PATENT AND TRADEMARK OFFICE
CERTIFICATE OF CORRECTION

PATENT NO. : 6,547,883 B2
DATED : April 15, 2003
INVENTOR(S) : Molnar

It is certified that error appears in the above-identified patent and that said Letters Patent is hereby corrected as shown below:

Column 18,
Line 2, "U" should be -- to --

Signed and Sealed this

Twenty-sixth Day of August, 2003

JAMES E. ROGAN
*Director of the United States Patent and Trademark Office*